US007810754B2

(12) United States Patent
Uozumi et al.

(10) Patent No.: US 7,810,754 B2
(45) Date of Patent: Oct. 12, 2010

(54) FILAMENT WINDING AUTOMATED SYSTEM

(75) Inventors: Tadashi Uozumi, Kyoto (JP); Hiroki Takashima, Kyoto (JP); Motohiro Tanigawa, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 188 days.

(21) Appl. No.: 12/167,070

(22) Filed: Jul. 2, 2008

(65) Prior Publication Data

US 2009/0038759 A1 Feb. 12, 2009

(30) Foreign Application Priority Data

Aug. 9, 2007 (JP) .............................. 2007-207623
Aug. 23, 2007 (JP) .............................. 2007-217150

(51) Int. Cl.
*B21C 47/02* (2006.01)

(52) U.S. Cl. ....................... 242/444; 242/437; 242/438; 242/441; 242/448

(58) Field of Classification Search ................. 242/437, 242/438, 438.1, 439.5, 441, 441.2, 444, 448
See application file for complete search history.

(56) References Cited

U.S. PATENT DOCUMENTS 3,616,061 A * 10/1971 Carter ........................ 156/431

(Continued)

FOREIGN PATENT DOCUMENTS

JP 05338043 A 12/1993

JP 2002283467 A 10/2002
JP 2004-148776 5/2004
JP 2004-148777 5/2004

(Continued)

OTHER PUBLICATIONS

Japanese language office action and its English language translation for corresponding Japanese application 2007207623 lists the reference above.

(Continued)

*Primary Examiner*—Emmanuel M Marcelo
(74) *Attorney, Agent, or Firm*—Hogan Lovells US LLP

(57) ABSTRACT

The present invention makes it possible to increase production efficiency while reducing costs. A filament winding automated system according to the present invention includes a winding device winding a fiber bundle R paid out from a head portion 12, 13, around a mandrel M1, an installing device 5 installing the mandrel around M1 which no fiber bundle has been wound yet, at a winding position, a discharging device 5 discharging the mandrel around which the fiber bundle has already been wound, from the winding position, a delivery device 3 holding and delivering the fiber bundle R from the mandrel around which the fiber bundle has already been wound to a mandrel M1 around which no fiber bundle has been wound yet, and a cutting device cutting the fiber bundle R, and after winding is completed, the delivery device 3 holds the fiber bundle R paid out from the head portion 12, 13, the cutting device cuts and separates the fiber bundle R from the mandrel around which the fiber bundle has already been wound, the discharging device 5 discharges the mandrel around which the fiber bundle has already been wound, the installing device installs the mandrel M1 around which no fiber bundle has been wound yet, and the winding device starts winding the fiber bundle R held by the delivery device 3, around the mandrel M1 around which no fiber bundle has been wound yet.

6 Claims, 30 Drawing Sheets

U.S. PATENT DOCUMENTS

| | | | | |
|---|---|---|---|---|
| 3,886,029 | A * | 5/1975 | Poulsen | 242/444 |
| 3,963,185 | A * | 6/1976 | Quirk | 242/437.1 |
| 4,028,164 | A * | 6/1977 | Montagut | 156/173 |
| 4,172,562 | A * | 10/1979 | Smith | 242/439.5 |
| 6,540,171 | B2 * | 4/2003 | Yasui et al. | 242/437 |
| 6,601,793 | B2 * | 8/2003 | Yasui et al. | 242/472.8 |
| 6,736,168 | B2 | 5/2004 | Amano et al. | |
| 7,300,014 | B2 * | 11/2007 | Allen | 242/439.5 |
| 2002/0139430 | A1 | 10/2002 | Amano et al. | |
| 2006/0175454 | A1 * | 8/2006 | Allen | 242/439.5 |

FOREIGN PATENT DOCUMENTS

| | | |
|---|---|---|
| JP | 2006082276 A | 3/2006 |
| JP | 2006-132746 | 5/2006 |

OTHER PUBLICATIONS

Japanese language office action and its English language translation for corresponding Japanese application 2007217150 lists the reference above.

\* cited by examiner

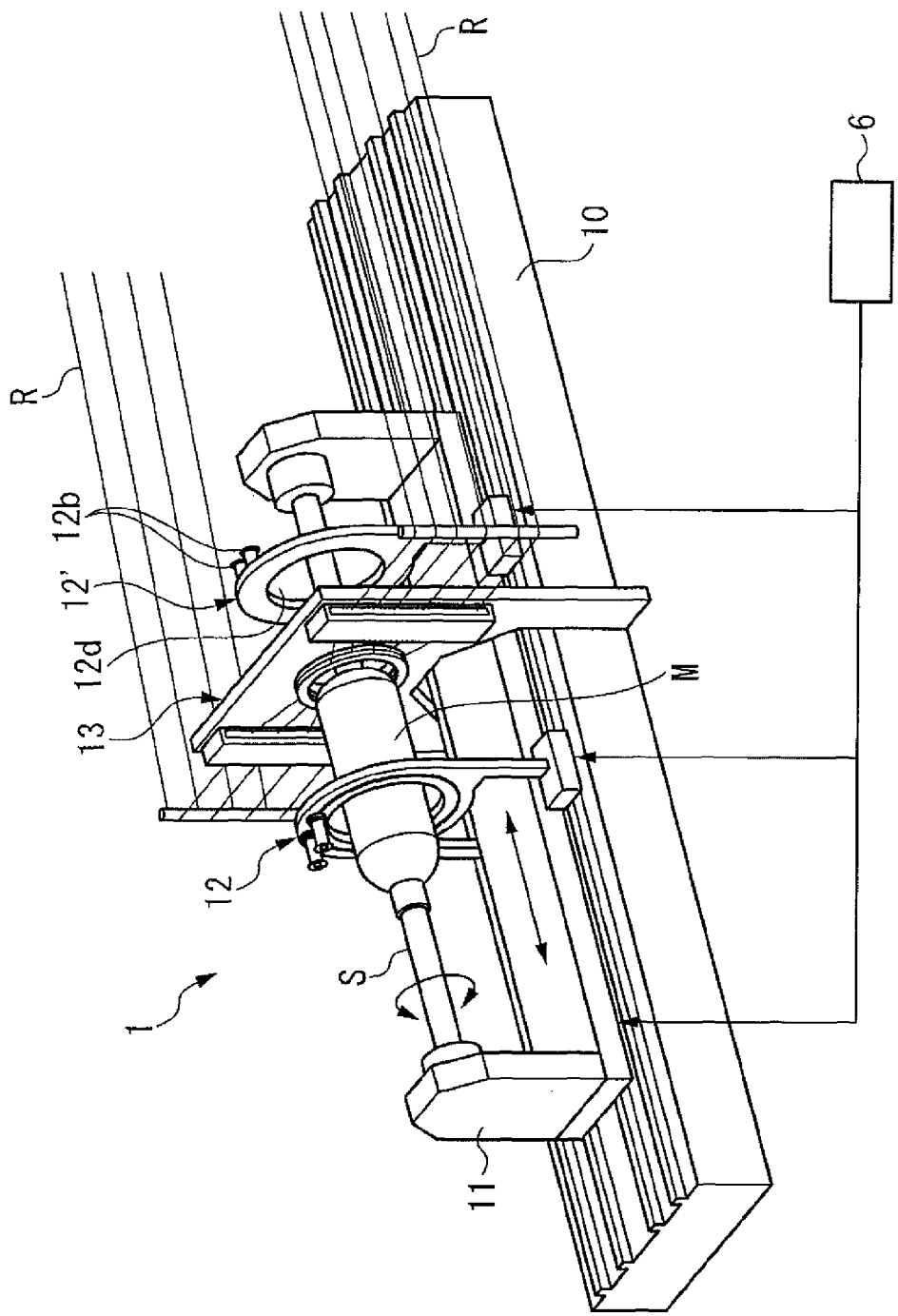

FILAMENT WINDING AUTOMATED SYSTEM

FIELD OF THE INVENTION

The present invention relates to a filament winding automated system having an automated production line based on a filament winding method.

BACKGROUND OF THE INVENTION

A filament winding device is a device that manufactures hollow containers such as pressure tanks or pipes on the basis of a filament winding method (see, for example, the Japanese Patent Application (Tokugan) No. 2007-34723 and the Japanese Patent Application Publication (Tokkai-Hei) No. 10-119138). The filament winding method manufactures products (pressure tanks or the like) by winding a fiber bundle around a mandrel (liner). The fiber bundle is made of, for example, a textile material formed using a textile material such as glass fibers and a synthetic resin.

The filament winding device winds a fiber bundle paid out from a head portion, around a mandrel. The head portion is composed of a hoop winding head that winds the fiber bundle around the mandrel in hoop form, and a helical winding head that winds the fiber bundle around the mandrel in helical form. For the hoop winding, the fiber bundle is wound around the mandrel substantially perpendicularly to an axial direction of the mandrel (FIG. 5A). For the helical winding, the fiber bundle is wound around the mandrel at a predetermined angle to the axial direction of the mandrel (FIGS. 5B and 5C).

The filament winding device winds the fiber bundle around the mandrel installed at a winding position. To accomplish this, the filament winding device installs the mandrel at the winding position to start winding, and after the winding is completed, discharges the mandrel from the winding position. The operation of installing and discharging the mandrel is manually performed by an operator. Moreover, at the beginning of the winding, the operator fixes a starting end to the mandrel, and at the end of the winding, cuts the fiber bundle from the mandrel.

Thus, the operator needs to perform various operations at the beginning and end of the winding. Disadvantageously, with an increase in the time required for operations performed by the operator and in the number of the operations, total production efficiency may decrease to increase costs.

SUMMARY OF THE INVENTION

In view of the above-described problems, an object of the present invention is to provide a filament winding automated system that enables an increase in production efficiency and a reduction in costs.

To accomplish this object, a filament winding automated system according to the present invention comprises a winding device winding a fiber bundle paid out from a head portion, around a mandrel, an installing device installing the mandrel around which no fiber bundle has been wound yet, at a winding position, a discharging device discharging the mandrel around which the fiber bundle has already been wound, from the winding position, a delivery device holding and delivering the fiber bundle from the mandrel around which the fiber bundle has already been wound to a mandrel around which no fiber bundle has been wound yet, and a cutting device cutting the fiber bundle.

Moreover, in the filament winding automated system according to the present invention, after the winding is completed, the delivery device holds the fiber bundle paid out from the head portion, the cutting device cuts and separates the fiber bundle from the mandrel around which the fiber bundle has already been wound, the discharging device discharges the mandrel around which the fiber bundle has already been wound, the installing device installs the mandrel around which no fiber bundle has been wound yet, and the winding device starts winding the fiber bundle held by the delivery device, around the mandrel around which no fiber bundle has been wound yet.

Preferably, the head portion comprises a hoop winding head winding the fiber bundle around mandrel in hoop form, and the hoop winding head comprises a bobbin from which the fiber bundle is paid out to the mandrel and a revolving mechanism revolving the bobbin in a circumferential direction of the mandrel, and reciprocates relative to the mandrel in an axial direction of the mandrel.

Preferably, the head portion comprises a helical winding head winding the fiber bundle around the mandrel in helical form, and reciprocates relative to the mandrel in an axial direction of the mandrel.

The filament winding automated system according to the present invention comprises the installing device and the discharging device. The installing device installs the mandrel around which no fiber bundle has been wound yet, at the winding position. The discharging device discharges the mandrel around which the fiber bundle has already been wound, from the winding position. Thus, the operator need not install the mandrel at the winding position or discharge the mandrel from the winding position.

Moreover, the filament winding automated system according to the present invention comprises the delivery device and the cutting device. The delivery device holds and delivers the fiber bundle from the mandrel around which the fiber bundle has already been wound to the mandrel around which no fiber bundle has been wound yet. The cutting device cuts the fiber bundle. Thus, the operator need not attach the starting end of the fiber bundle to the mandrel at the beginning of the winding or cut and separate the fiber bundle from the mandrel at the end of the winding.

Therefore, compared to conventional filament winding devices, the filament winding automated system according to the present invention allows almost all of the production line to be automated to sharply reduce the number of operations performed by the operator and the time required for the operations, enabling an increase in production efficiency and a reduction in labor and costs required.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 15 is an enlarged perspective view showing a winding device in FIG. 14.

DETAILED DESCRIPTION OF THE PREFERRED EMBODIMENTS

A filament winding automated system according to the present invention will be described below in detail with reference to the drawings.

First Embodiment

First, a first embodiment will be described.

[General Configuration]

Figure 1:
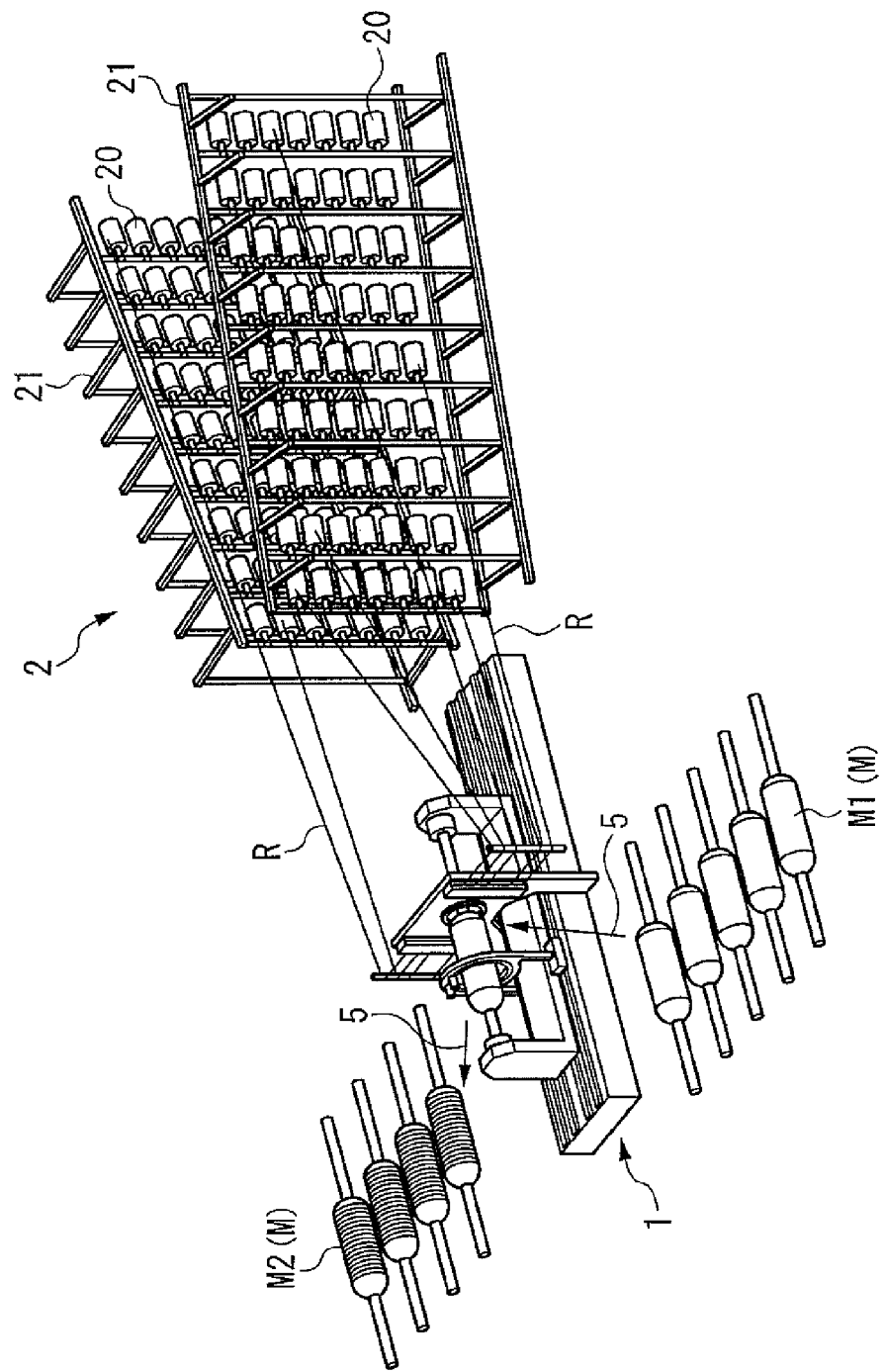
FIG. 1 is a partly omitted perspective view showing a filament winding automated system according to a first embodiment.

FIG. 1 is a partly omitted perspective view showing a filament winding automated system according to a first embodiment. The filament winding automated system comprises a winding device 1 and a supply portion 2.

The winding device 1 winds a fiber bundle R around a mandrel M. The supply portion 2 comprises support portions 21, 21, and a plurality of creels 20 in each of the creel support portions 21, 21. The fiber bundle B is wound around and housed on each of the creels 20.

A fiber bundle R is made of, for example, a textile material formed using a textile material such as glass fibers and a synthetic resin. The supply portion 2 supplies the fiber bundle R drawn out from each creel 20 to the winding device 1.

The fiber bundle R is pre-impregnated with a thermosetting synthetic resin material. The fiber bundle R may not be impregnated with any resin. In this case, a resin impregnating device (not shown in the drawings) is provided between the winding device 1 and the supply portion 2. The resin impregnating device applies the resin to the fiber bundle R drawn out from the creel 20 and supplies the resulting fiber bundle R to the winding device 1.

A plurality of mandrels M (M1, M2) are arranged on each of the opposite sides (the side closer to the reader and the side farther from the reader) of the winding device 1. The plurality of mandrels M1 around which no fiber bundle has been wound yet are arranged in front of the winding device 1 (closer to the reader). The plurality of mandrels M2 around which the fiber bundle has already been wound are arranged in front of the winding device 1 (farther to the reader). The mandrels M1, M2 are arranged at a first end (in the left of the figures) of the winding device 1.

[Winding Device]

Figure 2:
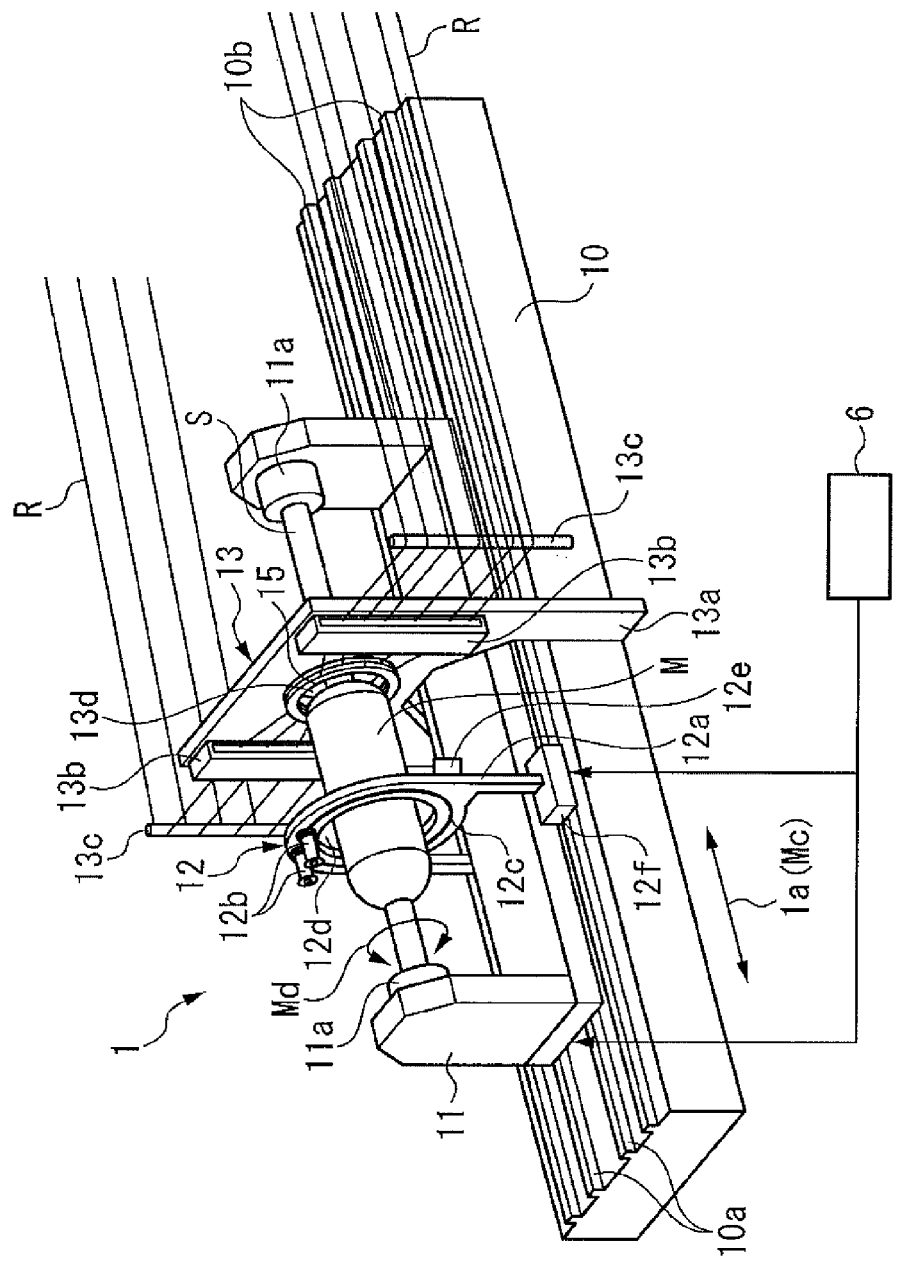
FIG. 2 is an enlarged perspective view showing a winding device in FIG. 1.

FIG. 2 is an enlarged perspective view showing the winding device in FIG. 1. The winding device 1 comprises a machine body 10. The machine body 10 comprises a pair of parallel first guide rails 10a, 10a extending in a longitudinal direction 1a. The winding device 1 comprises a mandrel moving table 11 on the machine body 10. The mandrel moving table 11 reciprocates along the first guide rails 10a, 10a in the longitudinal direction 1a.

The mandrel M comprises a spindle for mandrel S extending in a mandrel shaft direction Mc. The mandrel moving table 11 rotatably supports the spindle for mandrel S between opposite mandrel rotating shafts 11a, 11b. The mandrel rotating shafts 11a, 11b rotate the mandrel M around a center shaft together with the spindle for mandrel S.

When pressure tanks are manufactured, the mandrel M is formed of high-strength aluminum, metal, rein, or the like and shaped so as to have a cylindrical portion Ma and dome portions Mb arranged on the opposite sides of the cylindrical portion Ma (FIG. 5). The spindle for mandrel S is removably fixed to the mandrel M. The longitudinal direction 1a of the machine body 10 corresponds to a mandrel shaft direction Mc. The material, shape, or the like of the mandrel M may be varied depending on the product.

The winding device 1 comprises one hoop winding head 12 and one helical winding head 13. The hoop winding head 12 winds the fiber bundle R around the mandrel M in hoop form. The helical winding head 13 winds the fiber bundle R around the mandrel M in helical form.

The winding device 1 is drivingly controlled by a control section 6. The control section 6 controls reciprocation of the mandrel moving table 11 and rotation of the mandrel M via the mandrel rotating shafts 11a, 11b. The control section 6 controls reciprocation of the hoop winding head 12, revolving of a bobbin 12b, and the like. Furthermore, the control section 6 controls driving side wall portions 11b, 11b of the mandrel moving table 11, described below.

The hoop winding head 12 comprises a main body portion 12a. The main body portion 12a comprises an insertion portion 12d having a central opening. The hoop winding head 12 allows the mandrel M to be inserted through the insertion portion 12d.

The machine body 10 comprises a pair of guide rails 10a, 10b extending in the longitudinal direction 1a. The hoop winding head 12 comprises a moving base 12f and moves along the second guide rails 10b, 10b in the longitudinal direction 1a. Thus, the hoop winding head 12 reciprocates with the mandrel M inserted through the insertion portion 12d.

The hoop winding head 12 comprises a plurality of (in the present embodiment, two) bobbins 12b, 12b around each of which the fiber bundle R is wound and housed. The hoop winding head 12 comprises a revolving mechanism. The revolving mechanism comprises a groove 12c formed along a mandrel circumferential direction Md and a driving section 12e such as a motor; the guide groove 12c and the driving section 12e are arranged around the periphery of the insertion portion 12d. The bobbins 12b, 12b are revolved along the guide groove 12c by means of power from the driving section 12e. The fiber bundle R paid out from each of the revolving bobbins 12b, 12b is wound around the mandrel M.

The helical winding head 13 comprises a main body portion 13a. The main body portion 13a comprises an insertion portion 13d having a central opening. The helical winding head 13 allows the mandrel M to be inserted through the insertion portion 13d. The position of the helical winding head 13 is fixed in a central portion of the machine body 10 in the longitudinal direction 1a.

With the mandrel M inserted through the insertion portion 13d of the helical winding head 13, the mandrel moving table 11 reciprocates. Thus, the helical winding head 13 reciprocates in the longitudinal direction 1a relative to the mandrel M.

The helical winding head 13 winds the fiber bundle R drawn out from the supply portion 2, around the mandrel M. The helical winding head 13 comprises an annular guide ring portion 15 located around the periphery of the insertion portion 13d and extending along the mandrel circumferential direction Md. The main body portion 13a comprises tension portions 13b, 13b on the opposite sides of the guide ring portion 15. Moreover, the helical winding head 13 comprises guide rollers 13c, 13c on the opposite sides of the main body portion 13a.

The helical winding head 13 uses the guide rollers 13c, 13c to guide the fiber bundles R drawn out from the creel 20 to the tension portions 13b, 13b. The tension portions 13b, 13b apply a predetermined resin and tension to the fiber bundles R. The predetermined tension applied to the fiber bundles R by the tension portions 13b, 13b enables the fiber bundles R to be firmly wound around the mandrel M.

[Helical Winding Head]

Figure 3:
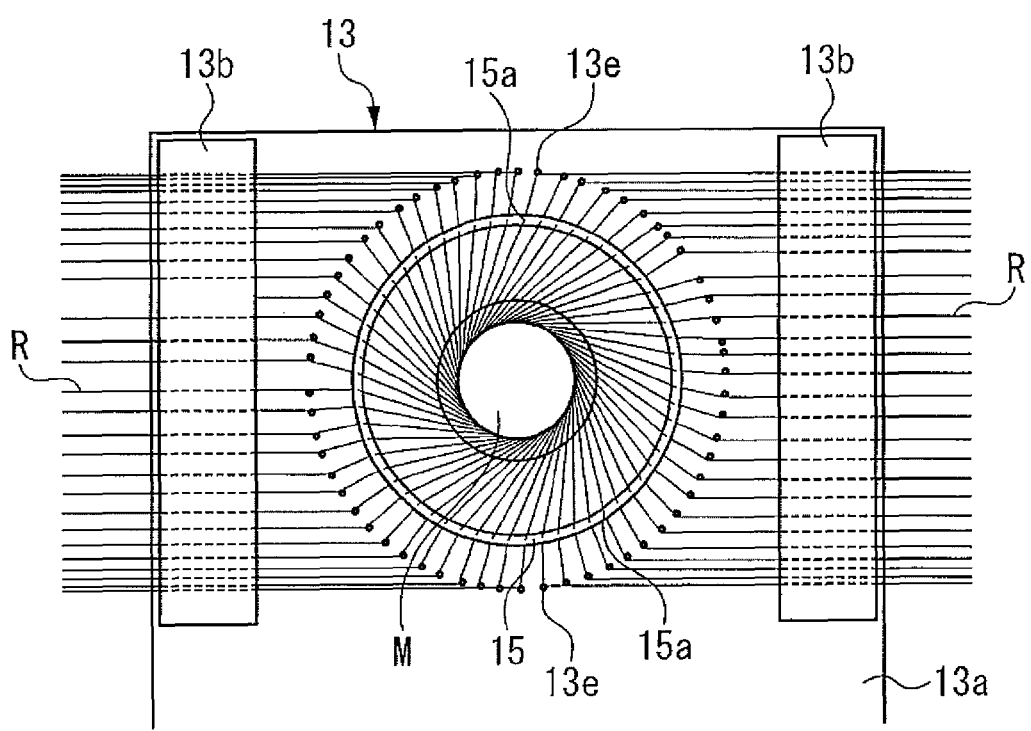
FIG. 3 is a front view showing a helical winding head 13.

FIG. 3 is a front view showing the helical winding head 13. The helical winding head 13 comprises a plurality of ring-like auxiliary guides 13e. The auxiliary guides 13e are arranged along the outside of the guide ring portion 15.

The fiber bundles R drawn out from the creels 20 are fed from the opposite sides of the helical winding head 13 through the guide rollers 13c to the tension portions 13b. The plurality of fiber bundles R are guided from the tension portions 13b via the auxiliary guides 13e to the guide ring portion 15. Moreover, the plurality of fiber bundles R are guided to the mandrel M via a plurality of guide holes 15a formed along the guide ring portion 15.

[Fiber Opening Guide]

Figure 4:
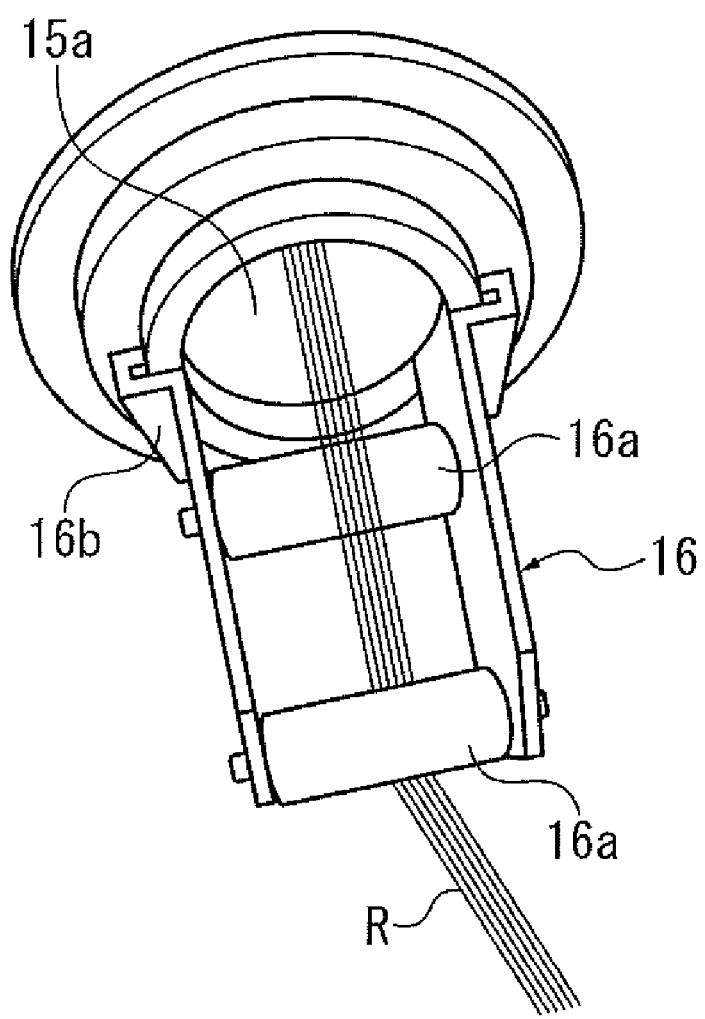
FIG. 4 is a perspective view showing a fiber opening guide.

FIG. 4 is a perspective view showing a fiber opening guide. The fiber opening guide 16 is provided inside the guide ring portion 15 of the helical winding head 13 for each of the guide holes 15a. The fiber opening guide 16 comprises a pair of rotatable fiber opening rollers 16a, 16b.

The fiber opening rollers 16a, 16a are arranged parallel to each other in a radial direction of the guide hole 15a. The fiber opening guide 16 comprises a rotating base 16b that is rotatable around the center of the guide hole 15a. The rotating base 16b supports the fiber opening rollers 16a, 16b.

The fiber bundle R is inserted between the paired fiber opening guides 16a, 16a of the fiber opening guide 16. Thus, even with a variation in a winding angle θ at which the fiber bundle R is wound around the mandrel M, the fiber opening guide 16 rotates freely to allow the fiber opening rollers 16a, 16a to wind the fiber bundle R around the mandrel M in a fiber opening condition (with the width of the fiber bundle 1 increased).

[Hoop Winding and Helical Winding]

Figure 5A:
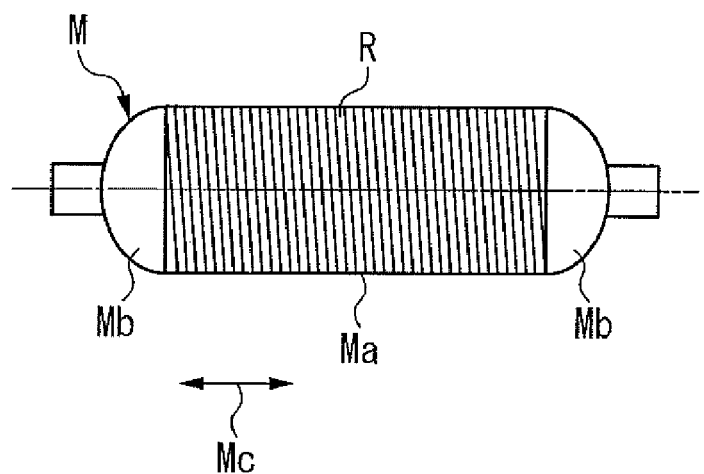
FIG. 5 is a side view showing hoop winding and helical winding.
Figure 5B:
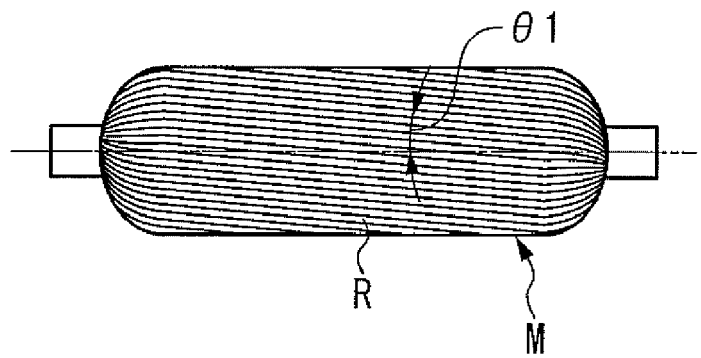
Figure 5C:
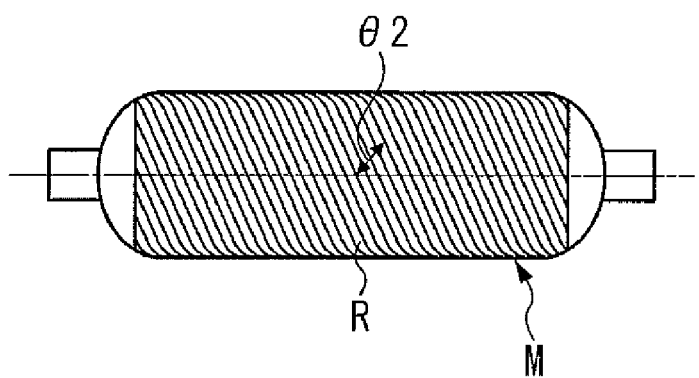

FIG. 5 is a side view showing hoop winding and helical winding. As shown in FIG. 5A, for the hoop winding, the fiber bundle R is wound substantially perpendicularly to the mandrel shaft direction Mc. As shown in FIGS. 5B and 5C, for the helical winding, the fiber bundle R is wound around the mandrel M at the predetermined angle θ (θ1, θ2) to the mandrel shaft direction Mc. As described above, the hoop winding head 12 is used for the hoop winding. The helical winding head 13 is used for the helical winding.

FIGS. 6 to 13 are side views showing a manufacturing process in the filament winding automated system according to the first embodiment. In the first embodiment, the mandrel M is installed at and discharged from only a first end side (in the left of the figures) of the machine body 10.

[Installing Operation]

Figure 6A:
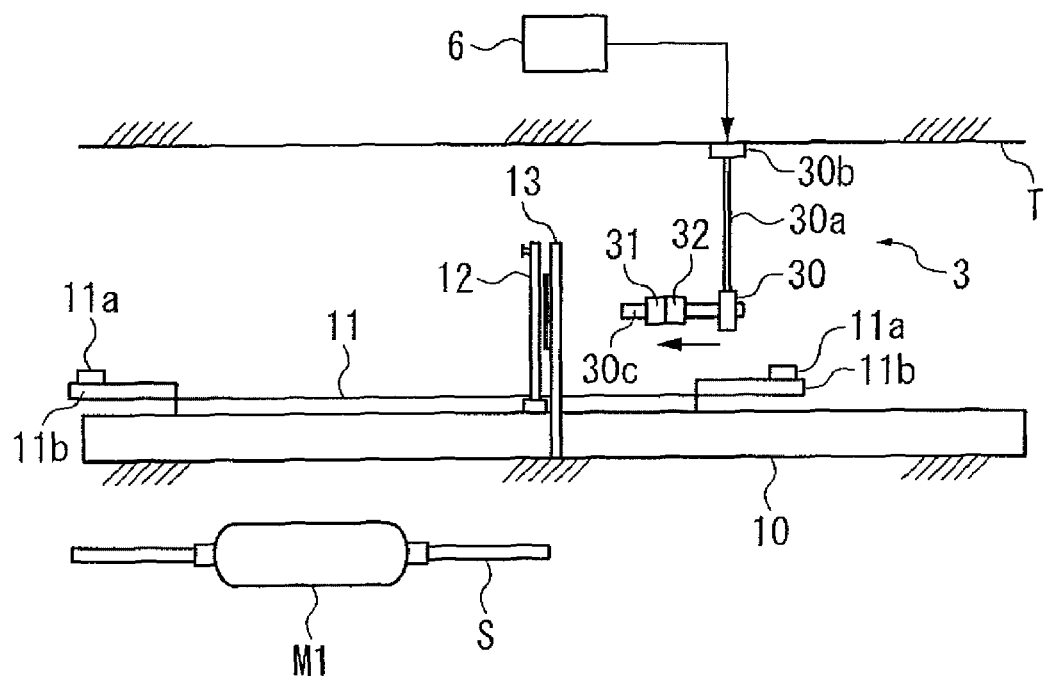
FIG. 6 is a side view showing a manufacturing process in the filament winding automated system according to the first embodiment.

As shown in FIG. 6A, the filament winding automated system comprises a delivery device 3. The delivery device 3 comprises a delivery hand portion 30. The delivery hand portion 30 removably grips and holds a delivery spindle 30c. The delivery hand portion 30 comprises an expansion arm 30a that is expandable in a vertical direction.

Moreover, the delivery hand portion 30 comprises a moving base 30b that is movable in a horizontal direction along a guide rail (not shown in the drawings) provided on a ceiling portion T. The delivery hand portion 30 is drivingly controlled by the control section 6.

The delivery spindle 30c holds a first delivery ring 31 and a second delivery ring 32. On the basis of spline coupling or the like, the delivery rings 31, 32 are slidable in an axial direction of the delivery spindle 30c while being regulated in a circumferential direction of the delivery spindle 30c.

The delivery rings 31, 32 are coupled together by an installing and removing mechanism (not shown in the drawings) utilizing, for example, the magnetic force of a permanent magnet. The positions of the delivery rings 31, 32 are fixed by the delivery spindle 30c. The delivery rings 31, 32 are separated from each other or from the delivery spindle 30c during a subsequent step.

The mandrel moving table 11 comprises mandrel rotating shafts 11a, 11a on the respective side wall portions 11b, 11b. The side wall portions 11b, 11b are set upright in the vertical direction for winding, and can be brought down in the horizontal direction to allow the mandrel M to be installed or discharged.

The mandrel moving table 11 stands by with the opposite side wall portions 11b, 11b laid flat. The delivery hand portion 30 moves from a second. end side (in the right of the figures) to the first end side (in the left of the figures) of the machine body 10 while gripping and holding the delivery spindle 30c.

Figure 6B:
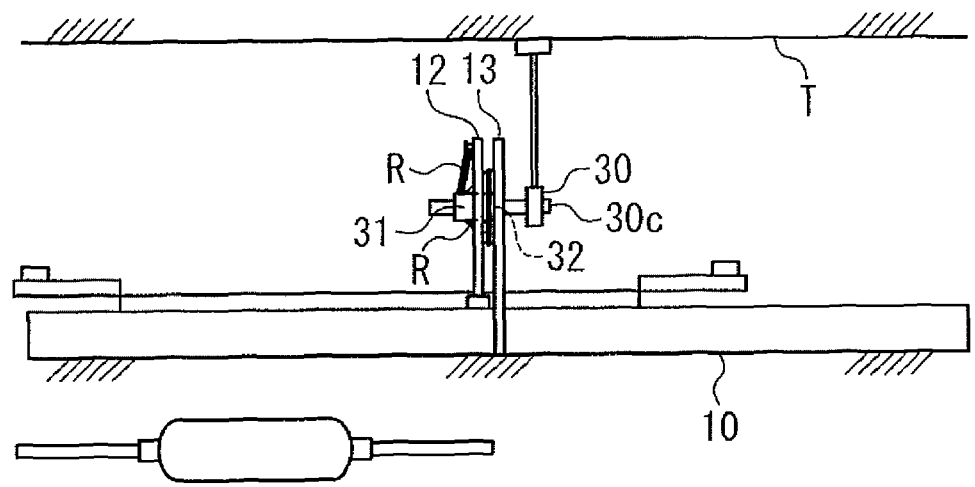

As shown in FIG. 6B, the delivery hand portion 30 positions the delivery spindle 30c inserted through the insertion portions 12d, 13d of the hoop winding head 12 and the helical winding head 13.

The positions of the delivery rings 31, 32 are fixed by chuck mechanisms (not shown in the drawings) provided on the head portions 12, 13. The starting end of the fiber bundle R paid out from the head portion 12, 13 is secured to the first delivery ring 31 with a tape or the like.

Figure 7A:
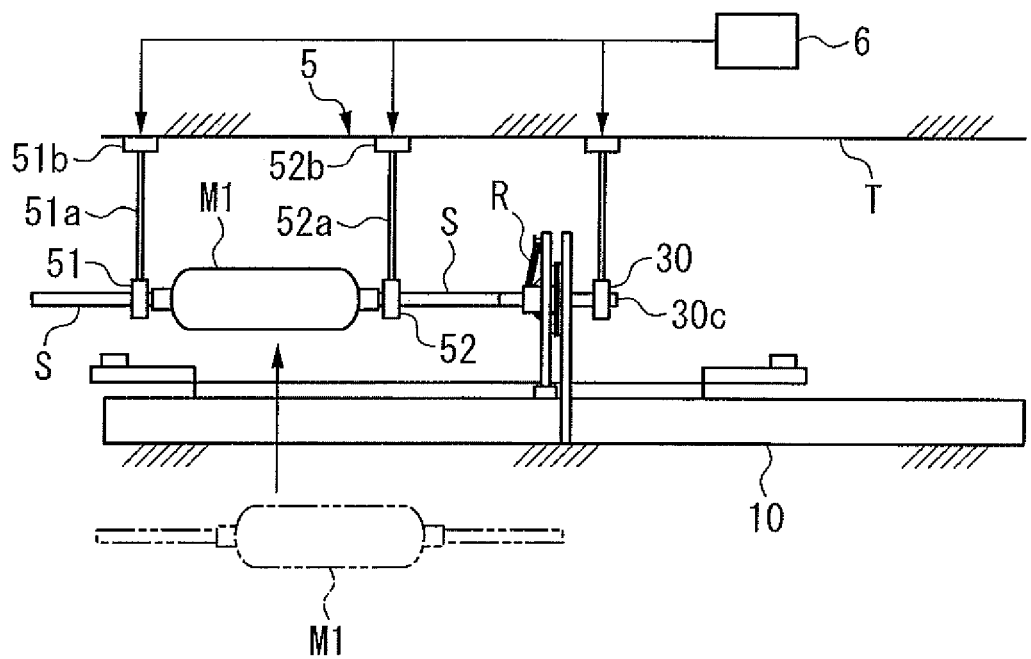
FIG. 7 is a side view continued from FIG. 6.

As shown in FIG. 7A, the filament winding automated system comprises an installing and discharging device 5. The installing and discharging device 5 comprises a first installing and discharging hand portion 51 and a second installing and discharging hand portion 52. The first and second installing and discharging hand portions 51, 52 removably grip the spindle for mandrel S to hold and move the mandrel M1 around which no fiber bundle has been wound yet and the mandrel M2 around which the fiber bundle has already been wound.

Like the delivery hand portion 30, the first and second installing and discharging hand portions 51, 52 comprise expansion arms 51a, 52a and moving bases 51b, 52b, respectively. The first and second installing and discharging hand portions 51, 52 are drivingly controlled by the control section 6.

The first and second installing and discharging hand portions 51, 52 grip and move the spindle for mandrel S on the opposite sides, respectively, of the mandrel M1 around which no fiber bundle has been wound yet. The first and second installing and discharging hand portions 51, 52 place the spindle for mandrel S such that a second end (in the right of the figures) of the spindle for mandrel S abuts against a first end (in the left of the figures) of the delivery spindle 30c.

Figure 7B:
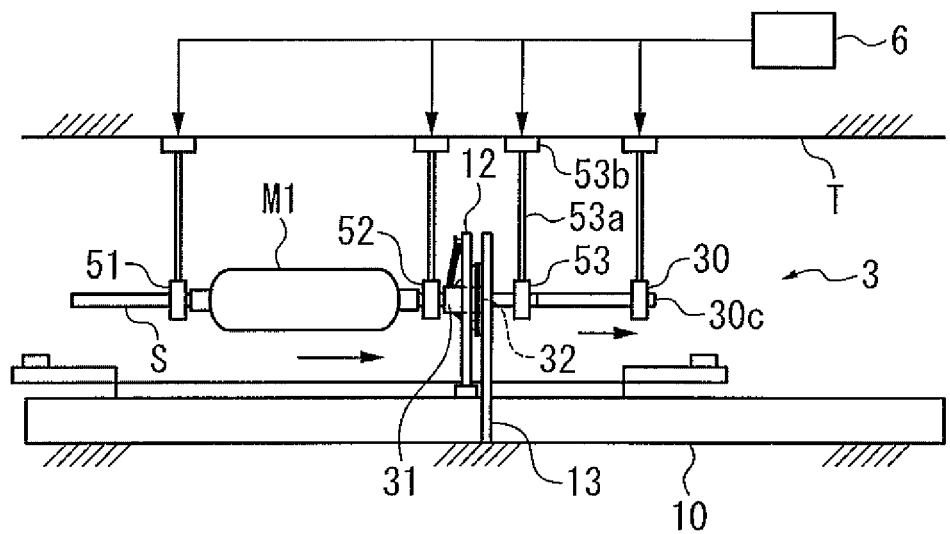

As shown in FIG. 7B, the first and second installing and discharging hand portions 51, 52 move the mandrel M1 toward the second end side (in the right of the figures) of the machine body 10. In synchronism with this, the delivery hand portion 30 moves the delivery spindle 30c toward the second end side (in the right of the figures) of the machine body 10. Thus, the spindle for mandrel S, and the delivery spindle 30c remain abutting against each other.

As described above, the positions of the delivery rings 31, 32 are fixed by the chuck mechanisms (not shown in the drawings) on the head portions 12, 13. The delivery rings 31, 32 are thus fitted around (delivered to) the spindle for mandrel S through the delivery spindle 30c and held therein.

The installing and removing mechanism (not shown in the drawings), fixing the position of the delivery rings 31, 32 to the delivery spindle 30c, exerts a weaker coupling force than the chuck mechanisms (not shown in the drawings). Thus, the above-described steps cause the delivery rings 31, 32 to leave the delivery spindle 30c.

The installing and discharging device 5 comprises a third installing and discharging hand portion 53. The third installing and discharging hand portion 53 has the same configuration as that of the first installing and discharging hand portion 51 and the like, and comprises an expansion arm 53a and a moving base 53b. The third installing and discharging hand portion 53 is drivingly controlled by the control section 6.

The third installing and discharging hand portion 53 holds the spindle for mandrel S at the second end side thereof (in the right of the figures). Thus, the second and third installing and discharging hand portions 52, 53 hold the spindle for mandrel S on the opposite sides, respectively, of the head portions 12, 13.

Figure 8A:
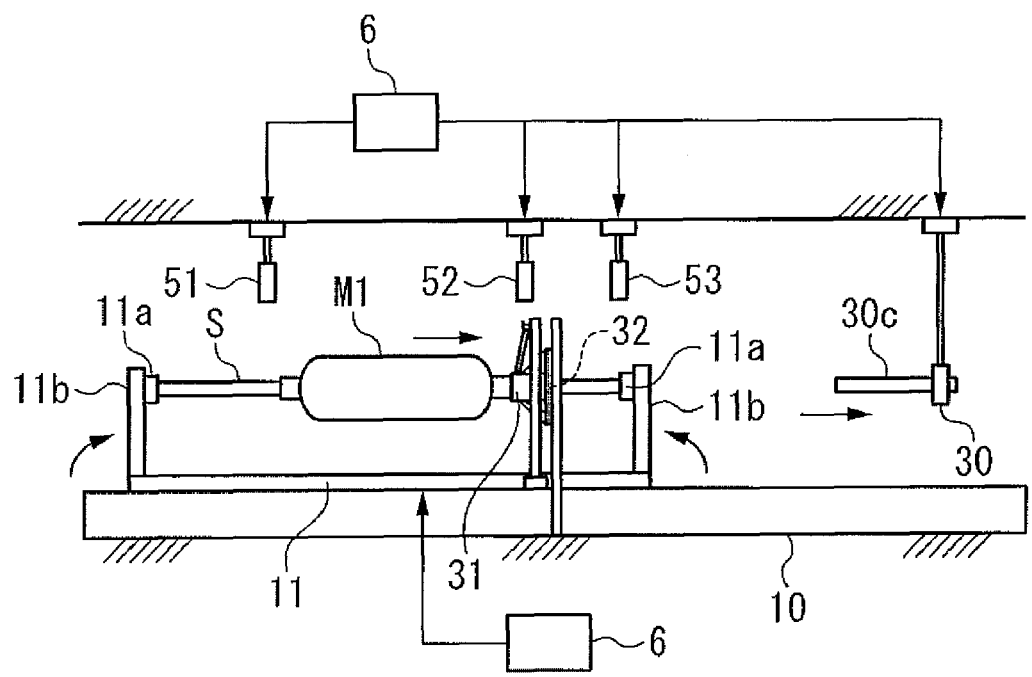
FIG. 8 is a side view continued from FIG. 7.

As shown in FIG. 8A, the delivery hand portion 30 retracts the delivery spindle 30c. The second installing and discharging hand portion 52 releases the spindle for mandrel S and is retracted upward using the expansion arm 52a.

Then, the first and third installing and discharging hand portions 51, 53 move the mandrel M1 toward the second end side (in the right of the figures) of the machine body 10. Thus, the delivery ring 31 joins the mandrel M1.

Then, the side wall portions 11a, 11b of the mandrel moving table 11 are set upright. The opposite ends of the spindle for mandrel S are coupled to and supported by the mandrel rotating shafts 11a, 11b. The mandrel moving table 11 rotatably supports the mandrel M1.

Thus, the mandrel M1 around which no fiber bundle has been wound yet is installed at the winding position. The first and third installing and discharging hand portions 51, 53 releases the spindle for mandrel S and are retracted using the expansion arms 51a, 53a. Then, the installing and discharging hand portions 51 to 53 are retracted.

[Winding Operation]

Figure 8B:
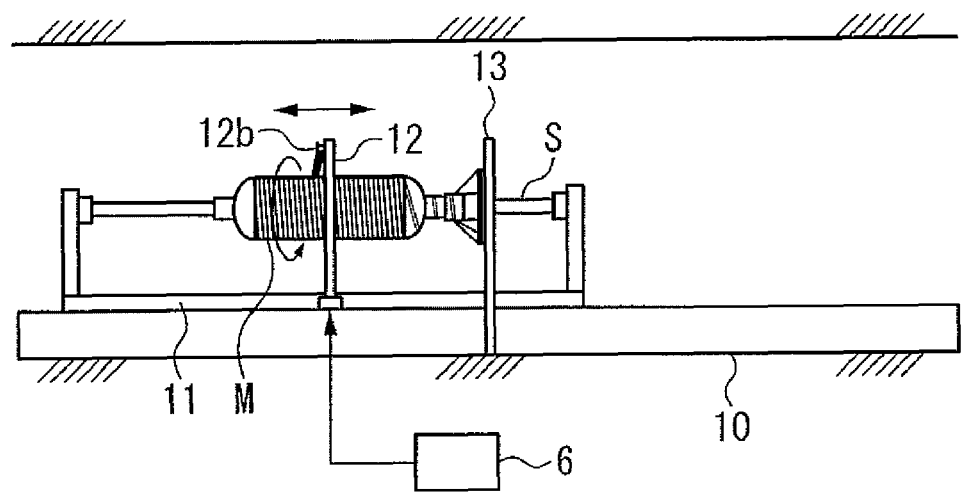

As shown in FIG. 8B, for hoop winding, the control section 6 allows the hoop winding head 12 to operate as described below. The hoop winding head 12 moves from the second end (in the right of the figures) to first end (in the left of the figures) of the mandrel M, while the bobbins 12b, 12b revolve. The mandrel moving table 11 is stopped, so that the mandrel M does not move or rotate.

Thus, the fiber bundle R is paid out from each of the bobbins 12b, 12b. The fiber bundle R is wound around the mandrel M substantially orthogonally (slightly slantingly) to the mandrel axial direction Mc (FIG. 5) so that windings do not overlap one another but are arranged parallel to one another without any gap therebetween. The moving speed of the hoop winding head 12 and the revolving speed of the bobbins 12b, 12b are determined so as to achieve the above-described winding.

The hoop winding head 12 moves from a second end (in the right of the figures) to a first end (in the left of the figures) of the mandrel cylindrical portion Ma (FIG. 5) to stack a layer of the fiber bundle R on the mandrel cylindrical portion Ma. Then, until a required number of layers of the fiber bundle R are stacked, the hoop winding head 12 reciprocates between one end (in the left of the figures) to other end (in the right of the figures) of the mandrel cylindrical portion Ma.

Figure 9A:
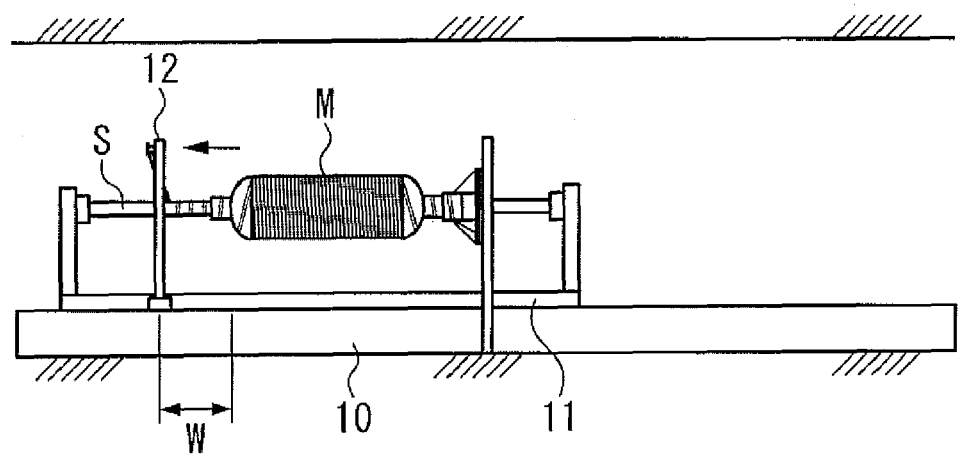
FIG. 9 is a side view continued from FIG. 8.

After the hoop winding is completed, the hoop winding head 12 is retracted to one end side (in the left of the figures) of the mandrel moving table 11 as shown in FIG. 9A. The hoop winding head 12 is placed on the spindle for mandrel S at a predetermined distance W from the mandrel M.

Figure 9B:
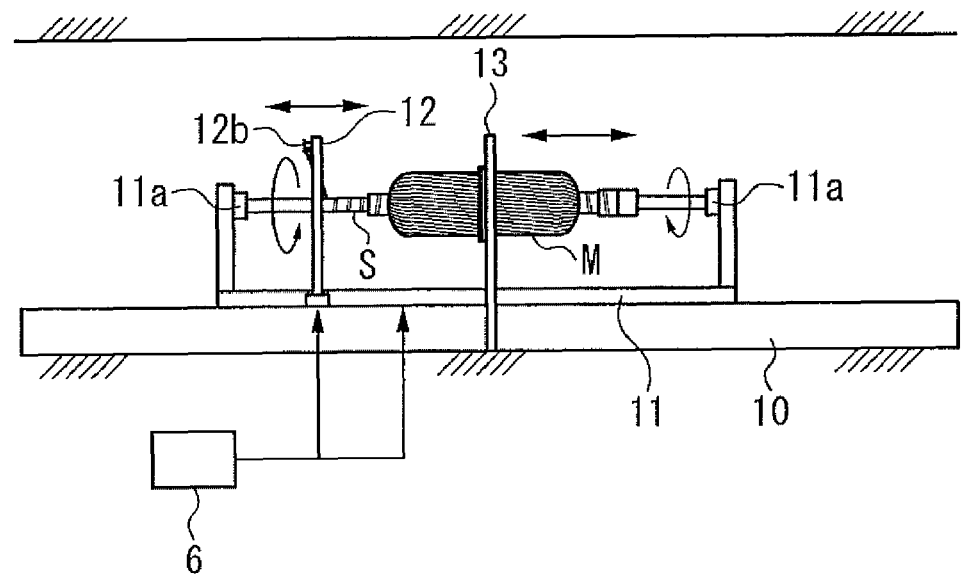

As shown in FIG. 9B, for helical winding, the control section 6 allows the mandrel moving table 11 to operate as described below. The mandrel moving table 11 moves so as to move the helical winding head 13 relative to the mandrel M from other end (in the right of the figures) to one end (in the left of the figures) of the mandrel M. In conjunction with the movement, the mandrel rotating shafts 11a, 11b rotate the mandrel M.

The plurality of fiber bundles R paid out from the helical winding head 13 are wound at the winding angle θ1 to the mandrel axial direction Mc (FIG. 5) by a mandrel paralyzing portion so that windings do not overlap one another but are arranged parallel to one another without any gap therebetween. The moving speed of the mandrel moving table 11 (helical winding head 13) and the rotating speed of the mandrel rotating shaft 11a (mandrel M) are determined so as to achieve the above-described winding.

The helical winding head 13 moves from other end (in the right of the figures) to one end (in the left of the figures) of the mandrel M to stack a layer of the fiber bundles R on the mandrel M. Then, until a required number of layers of the fiber bundles R are stacked, the helical winding head 13 reciprocates between one end (in the left of the figures) to other end (in the right of the figures) of the mandrel M.

Moreover, the hoop winding head 12 moves in synchronism with the mandrel moving table 11 so as to maintain a predetermined distance W from the mandrel M. Furthermore, the bobbins 12a, 12b revolve in the same direction as that of the mandrel M in synchronism with the rotation of the mandrel M so as to prevent extra fiber bundles R from being paid out from the bobbins 12b, 12b and wound around the spindle for mandrel S, by the rotation of the mandrel M.

Figure 10A:
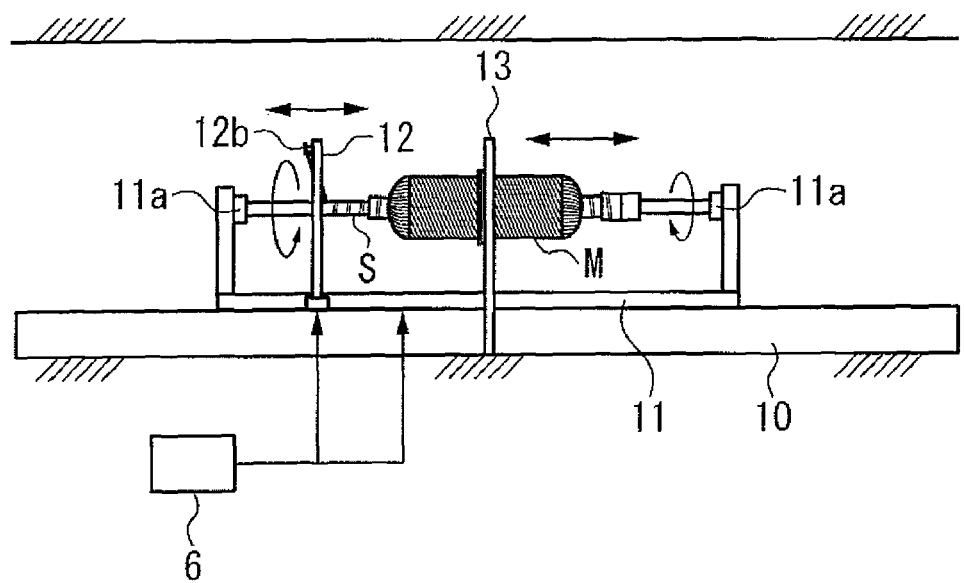
FIG. 10 is a side view continued from FIG. 9.
Figure 10B:
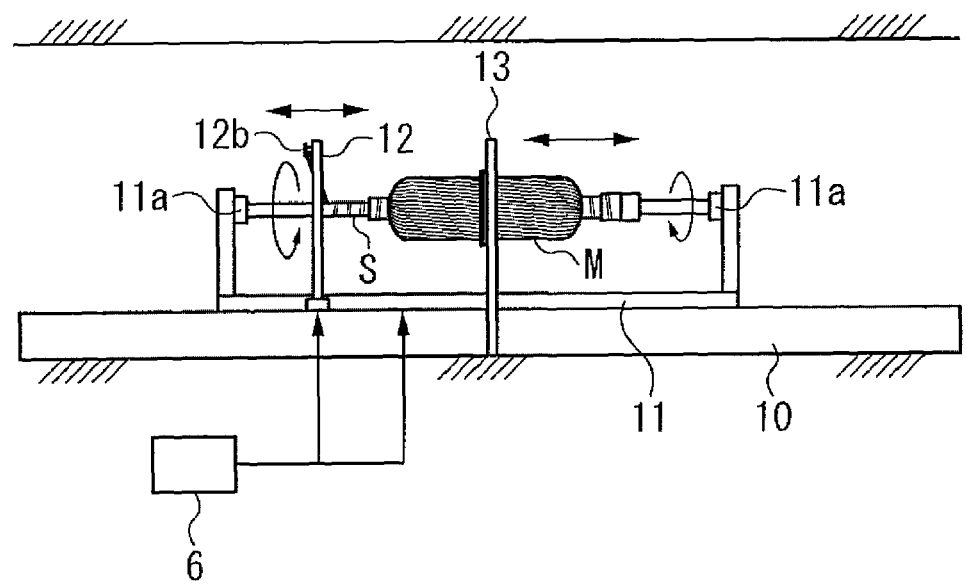

When helical winding is performed at the winding angle θ2 (>θ1) as shown in FIG. 10A and subsequently performed at the winding angle θ1 again as shown in FIG. 10B, the mandrel moving table 11 and the hoop winding head 12 move as described above.

Figure 11A:
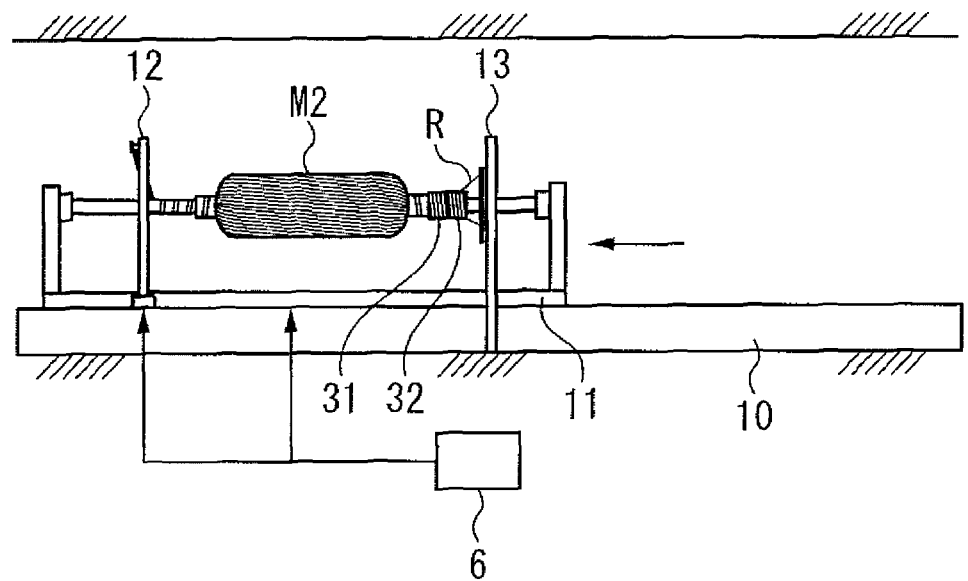
FIG. 11 is a side view continued from FIG. 10.

As shown in FIG. 11A, after a required number of layers of helical winding are obtained, the mandrel moving table 11 moves to one end side (in the left of the figures) of the machine body 10. The helical winding head 13 is placed at other end side (in the right of the figures) of the mandrel moving stage 11. Thus, the fiber bundles B paid out from the helical winding head 13 are wound around the delivery rings 31, 32.

Figure 11B:
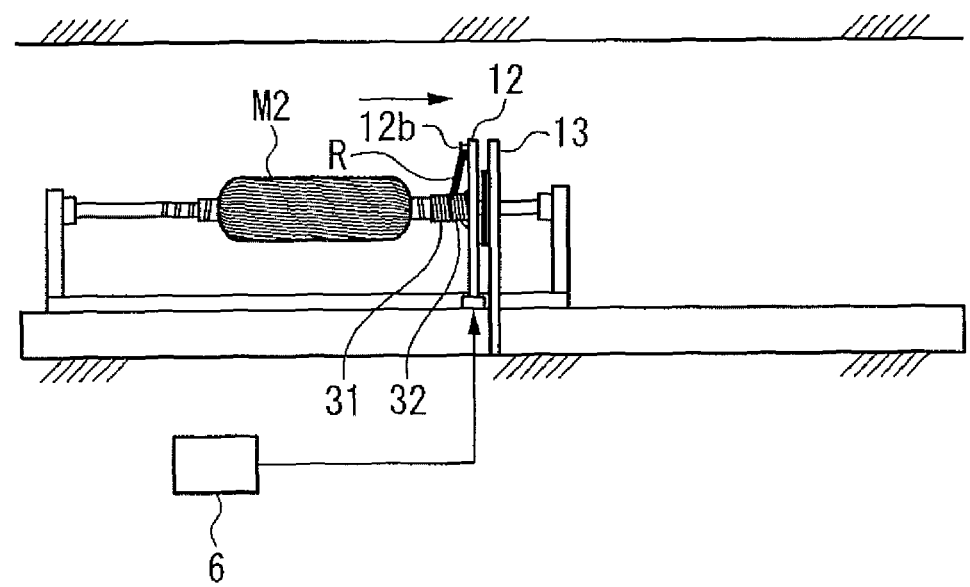

As shown in FIG. 11B, after a required number of layers of hoop winding are obtained, the hoop winding head 12 moves to other end side (in the right of the figures) of the mandrel M2. Thus, the fiber bundle R paid out from the bobbin 12b is wound around the delivery rings 31, 32.

Consequently, the fiber bundles R paid out from the head portions 12, 13 are wound and held around the delivery rings 31, 32.

As described above, for the fiber bundle R wound around the mandrel M2, the starting end is located on the first delivery ring (mandrel M-side delivery ring) 31. The terminal is located on the second delivery ring (the delivery ring located opposite the mandrel M) 32.

Figure 12A:
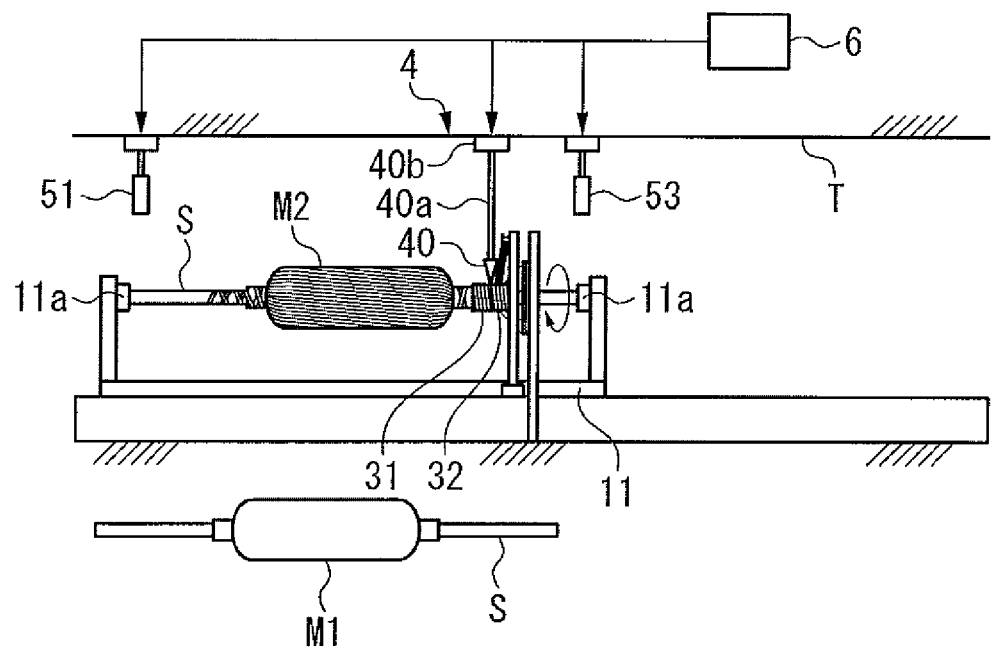
FIG. 12 is a side view continued from FIG. 11.

As shown in FIG. 12A, the filament winding automated system comprises a cutting device 4. The cutting device 4 comprises a cutter portion 40. The cutter portion 40 comprises an expansion arm 40a and a moving base 40b. The cutter portion 40 is drivingly controlled by the control section 6.

The cutter portion 40 places a cutting edge between the delivery rings 31, 32. The mandrel rotating shafts 11a, 11a rotate the delivery rings 31, 32 in conjunction with the mandrel M2. Thus, the fiber bundle R wound around the delivery rings 31, 32 is cut and separated between the delivery rings 31, 32.

[Discharging Operation]

Figure 12B:
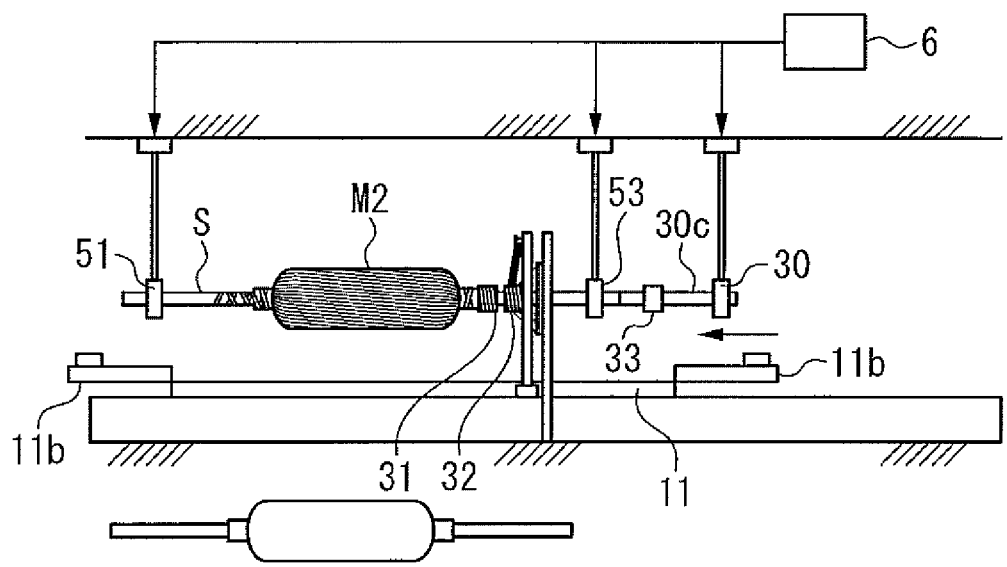

As shown in FIG. 12B, the first and third installing and discharging hand portions 51, 53 grip the opposite sides, respectively, of the spindle for mandrel S to hold the mandrel M2. In this condition, the side wall portions 11b, 11b of the mandrel moving table 11 are brought down such that the mandrel M2 around which the fiber bundle has already been wound can be discharged from the winding position or the mandrel M2 around which no fiber bundle has been wound yet can be installed at the winding position.

The delivery hand portion 30 moves the delivery spindle 30c. The delivery spindle 30c holds a third delivery ring 33. The delivery hand portion 30 causes one end (in the left of the figures) of the delivery spindle 30c to abut against other end (in the right of the figure) of the spindle for mandrel S.

Figure 13A:
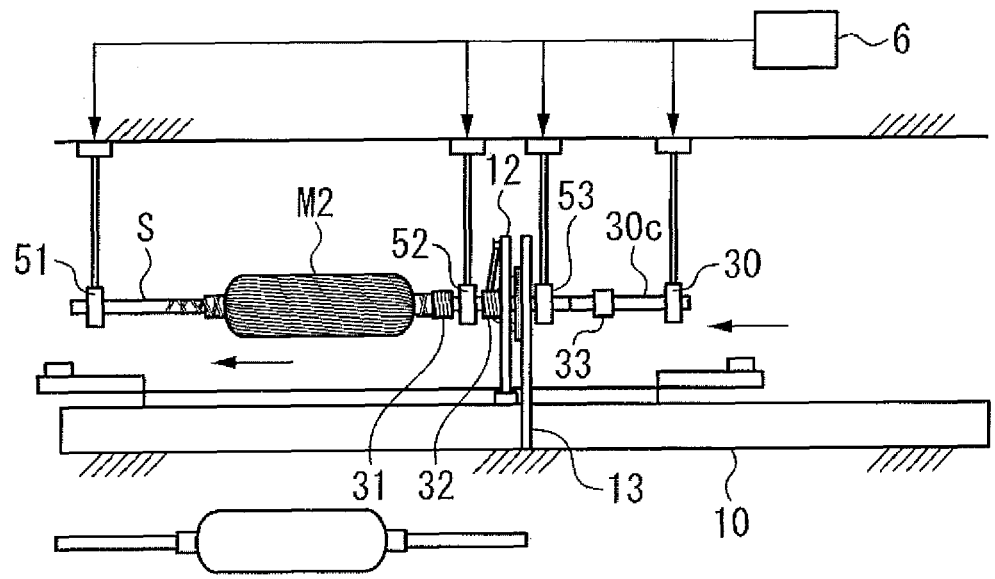
FIG. 13 is a side view continued from FIG. 12.

As shown in FIG. 13A, with the spindle for mandrel S and the delivery spindle 30c abutting against each other, the first and third installing and discharging hand portions 51, 53 and the delivery hand portion 30 slightly move the mandrel MS (spindle for mandrel S) and the delivery spindle 30c to one end side (in the left of the figures) of the machine body 10.

At this time, the chuck mechanisms (not shown in the drawings) provided on the head portions 12, 13 release the first delivery ring 31 (the position of the second delivery ring 32 is fixed). Consequently, the first delivery ring 31 leaves the second delivery ring 32 together with the mandrel M2.

Then, the second installing and discharging portion 52 grips and holds the spindle for mandrel S between the first delivery ring 31 and the second delivery ring 32. Thus, the first and second installing and discharging portions 51, 52 hold the opposite sides, respectively, of the mandrel M2. The third installing and discharging portion 53 is retracted.

Moreover, with the spindle for mandrel S and the delivery spindle 30c abutting against each other, the first and second installing and discharging portions 51, 52 and the delivery hand portion 30 move the spindle for mandrel S and the delivery spindle 30c to one end side (in the left of the figures) of the machine body 10.

Figure 13B:
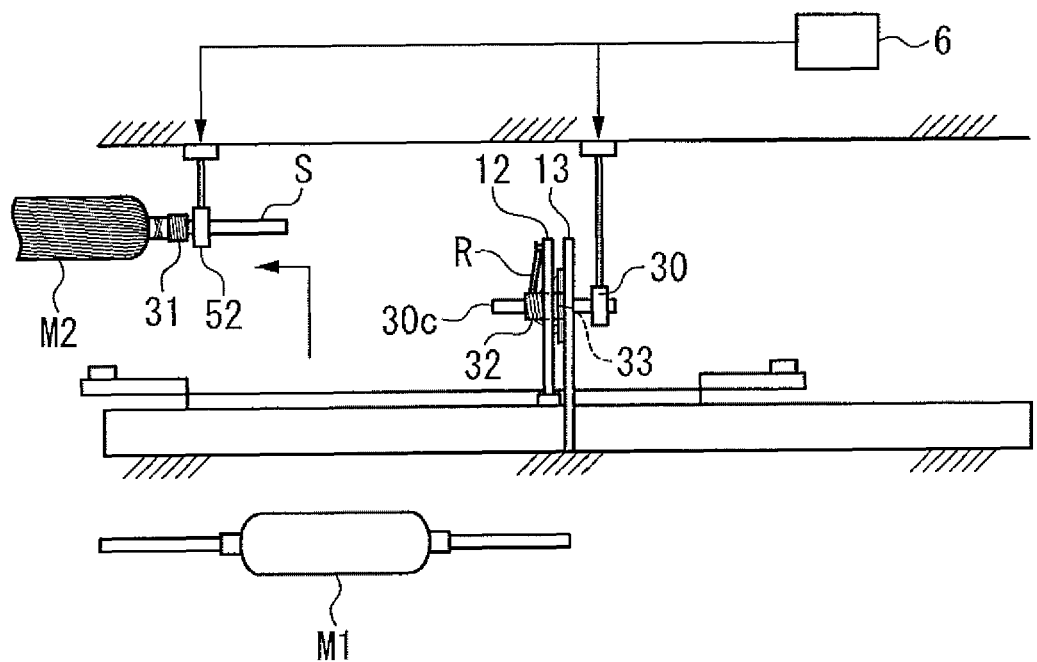

As shown in FIG. 13B, the second delivery ring 32 is fitted around (delivered to) the delivery spindle 30c through the spindle for mandrel S and held therein. The third delivery ring 33 is coupled to the second delivery ring 32 by the installing and removing mechanism (not shown in the drawings). The delivery spindle 30c holds the second delivery ring 32 and the third delivery ring 33.

The first and second installing and discharging portions 51, 52 discharge the mandrel M2 around which the fiber bundle R has already been wound, from the winding position. The above-described manufacturing process completes one winding mandrel M2 (product).

The fiber bundle R paid out from the head portions 12, 13 is wound and held around the second delivery ring 32. FIG. 13B shows a condition corresponding to that shown in FIG. 6B.

[Delivery Operation]

Subsequently, the above-described [installing operation] (FIG. 7A to FIG. 8A) and [winding operation] (FIG. 8B to FIG. 11C) are performed. The fiber bundle R paid out from the head portions 12, 13 is wound around the next mandrel M1 through the second delivery ring 32. Consequently, the second delivery ring 32 delivers the fiber bundle R from the mandrel M2 around which the fiber bundle R has already been wound to the mandrel M1 around which no fiber bundle has been wound yet.

Then, after the winding operation is completed, the fiber bundle R wound around the mandrel M2 is wound around the third delivery ring 33. Subsequently, the [cutting operation] (FIGS. 12A) and [discharging operation] (FIG. 12A to FIG. 13B) are performed. The third delivery ring 33 delivers the fiber bundle R from the mandrel M2 around which the fiber bundle R has already been wound to the mandrel M1 around which no fiber bundle has been wound yet.

[Repeating Operation]

With the [installing operation], [winding operation], [cutting operation], [discharging operation], and [delivery operation] (FIGS. 7 to 13) repeated as described above, the production line can be automated and almost no operation needs to be performed by the operator.

Second Embodiment

Now, a second embodiment will be described. A detailed description will be given of arrangements of the second embodiment which are different from the corresponding ones of the first embodiment (arrangements of the second embodiment are the same as the corresponding ones of the first embodiment unless otherwise specified).

[General Configuration]

Figure 14:
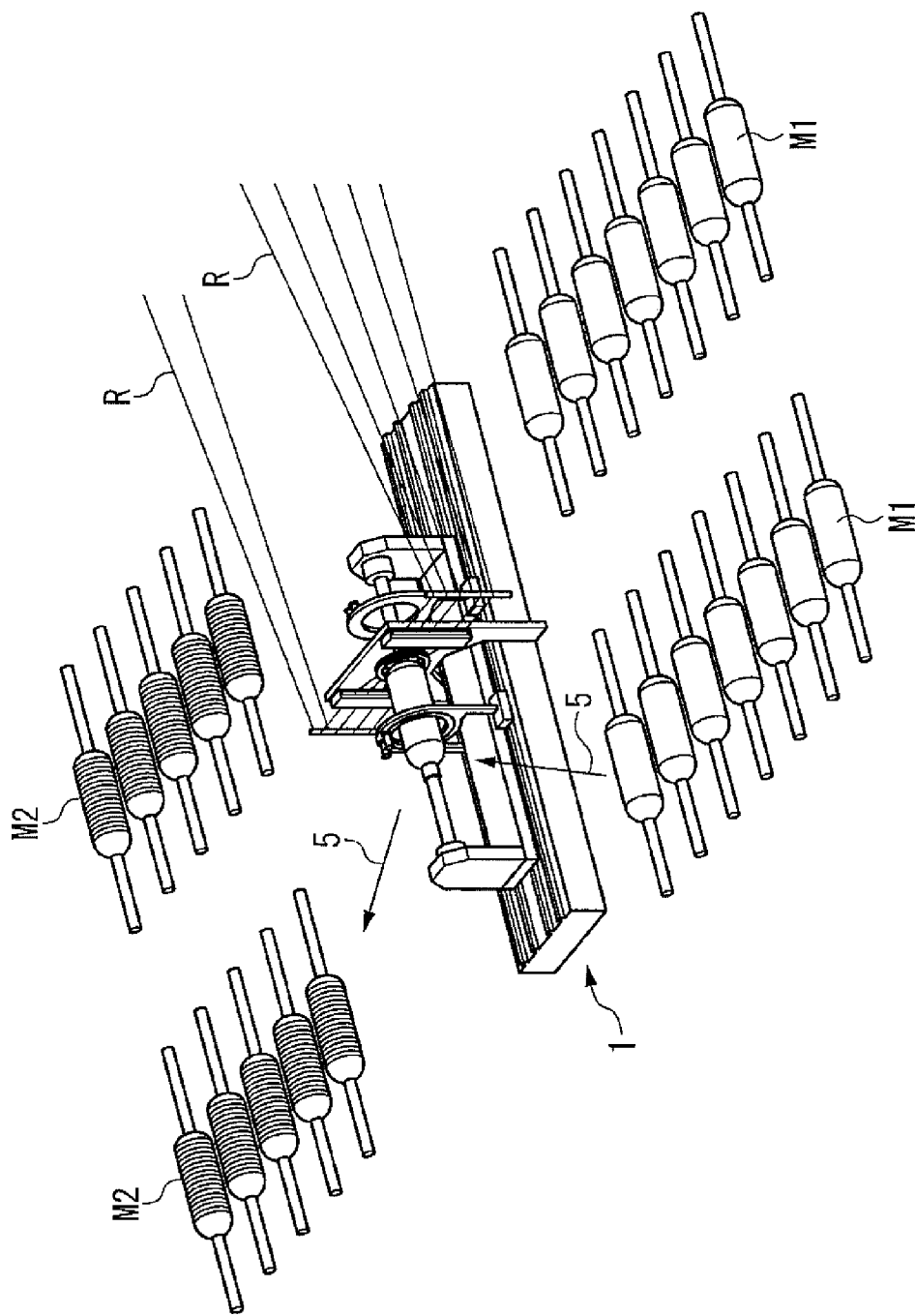
FIG. 14 is a partly omitted perspective view showing a filament winding automated system according to a second embodiment.

FIG. 14 is a partly omitted perspective view showing a filament winding automated system according to the second embodiment. A plurality of the mandrels (M1, M2) are arranged on each of the opposite sides (the side closer to the reader and the side farther from the reader) of the winding device 1. In the second embodiment, the mandrels M (M1, M2) are arranged on each of one end side (in the left of the figures) and other end side (in the right of the figures) of the winding device 1.

[Winding Device]

FIG. 15 is an enlarged perspective view showing the winding device shown in FIG. 14. The winding device 1 comprises two hoop winding heads 12, 12' and the one helical head 13. The first hoop winding head 12 is located on one end side (in the left of the figures), and the second hoop winding head 12' is located on other end side (in the right of the figures).

FIGS. 16 to 30 are side views showing a manufacturing process in the filament winding automated system according to the second embodiment. In the second embodiment, the mandrels M are installed on and discharged from each of one end side (in the left of the figures) and other end side (in the right of the figures) of the machine body 10.

[Installing Operation]

Figure 16A:
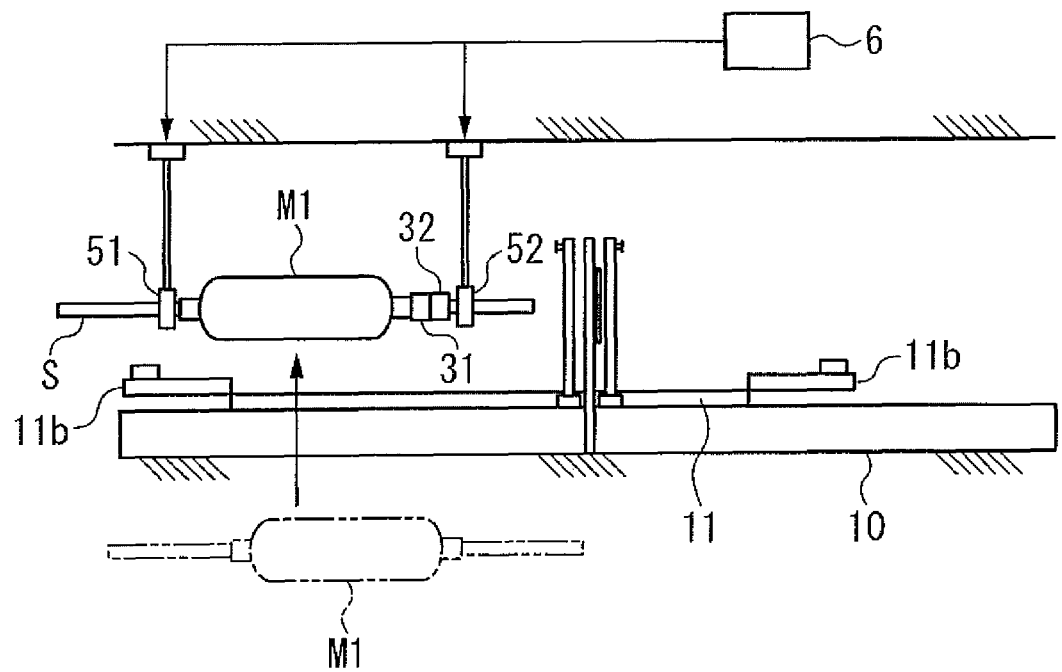
FIG. 16 is a side view showing a manufacturing process in the filament winding automated system according to the second embodiment.

As shown in FIG. 16A, the control section 6 allows the first and second installing and discharging hand portions 51, 52 grip and hold one of the mandrels M1 which are located on one end side (in the left of the figures) and around which no fiber bundle M1 has been wound yet. The first and second installing and discharging hand portion 51, 52 then move the mandrel M1 toward the mandrel moving table 11.

The mandrel M1 holds the first delivery ring 31 and the second delivery ring 32 on other end side (in the right of the figures) of the spindle S for the mandrel M1. The rotation of the first delivery ring 31 and the second delivery ring 32 in the circumferential direction of the spindle for mandrel S is regulated by spline coupling or the like. The opposite side wall portions 11b, 11b of the mandrel moving table 11 are brought down so as to allow the mandrel M1 to move to the winding position.

Figure 16B:
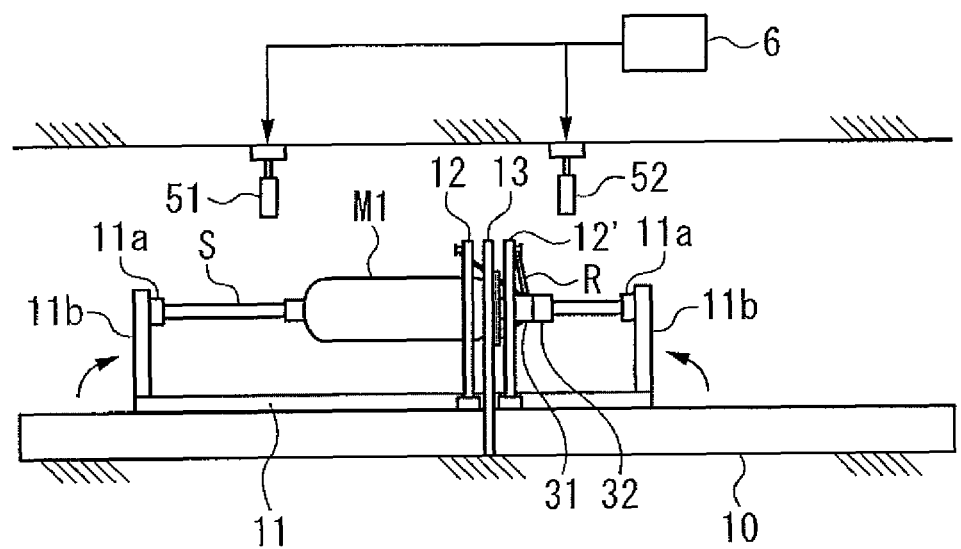

As shown in FIG. 16B, the opposite side wall portions 11b, 11b of the mandrel moving table 11 are set upright. The opposite ends of the spindle for mandrel S are coupled to the mandrel rotating shafts 11a, 11a, respectively. The mandrel M1 is thus installed at the winding position.

The first and second installing and discharging hand portions 51, 52 release the mandrel M1 and are retracted. The starting end of the fiber bundle R paid out from the head portions 12, 12', and 13 is fixed to the first delivery ring (mandrel M1-side delivery ring) 31.

The positions of the first delivery ring 31 and the second delivery ring 32 are fixed by the chuck mechanisms (not shown in the drawings) provided on the head portions 12, 12' 13. The first delivery ring 31 is coupled to the mandrel M1 by a coupling mechanism (not shown in the drawings) such as a hook. The first delivery ring 31 and the second delivery ring 32 are coupled together by the installing and removing mechanism (not shown in the drawings) utilizing, for example, the magnetic force of the permanent magnet.

[Winding Operation]

Figure 17A:
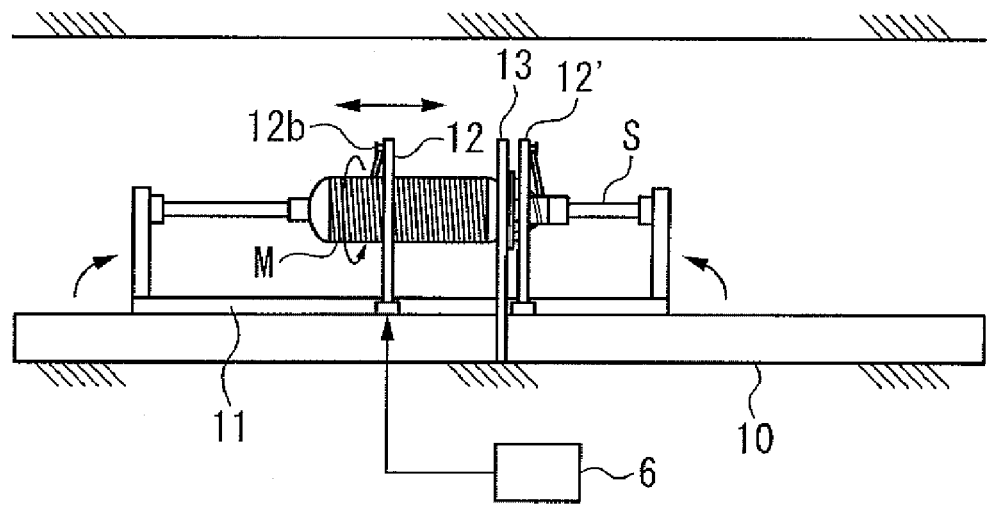
FIG. 17 is a side view continued from FIG. 16.

As shown in FIG. 17A, for hoop winding, the control section 6 allows the first hoop winding head 12 to operate. Until a require number of layers of the fiber bundle R are stacked, the first hoop winding head 12 reciprocates between one end (in the left of the figures) and other end (in the right of the figures) of the mandrel cylindrical portion Ma (FIG. 5). The mandrel moving table 11 and the second hoop winding head 12' are stopped.

Figure 17B:
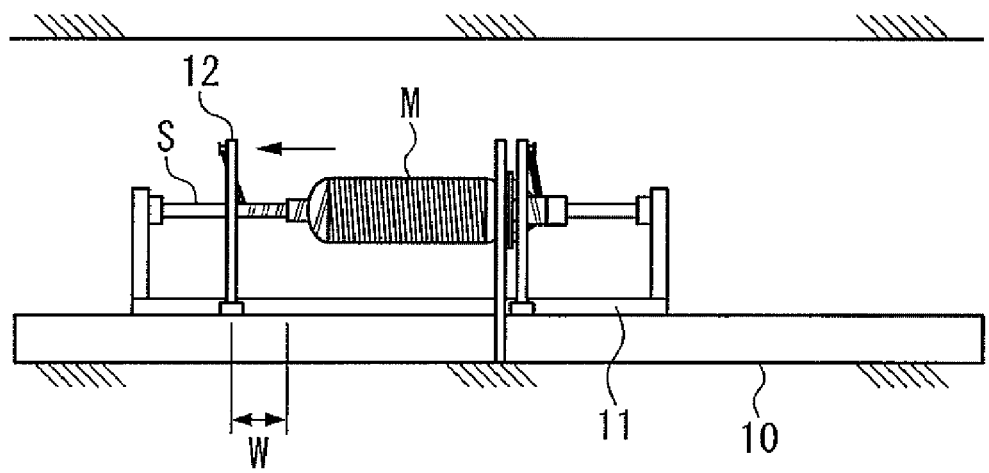

After the hoop winding is completed, the first hoop winding head 12 is retracted to one end side (in the left of the figures) of the mandrel moving table 11 as shown in FIG. 17B.

The first hoop winding head 12 is located on the spindle for mandrel S at the predetermined distance from the mandrel M.

Figure 18A:
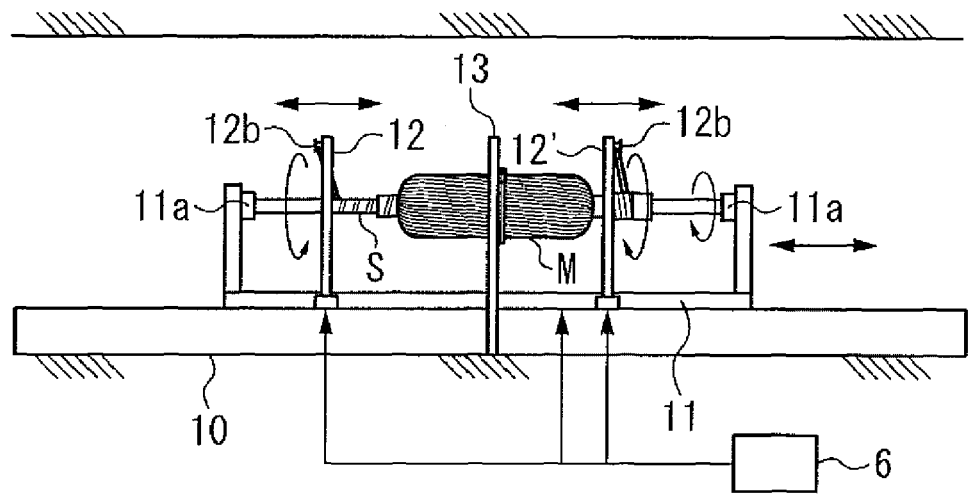
FIG. 18 is a side view continued from FIG. 17.

As shown in FIG. 18A, for helical winding, the control section 6 allows the mandrel moving table 11 to operate. Until a required number of layers of the fiber bundle R are stacked (winding angle θ1), the mandrel moving table 11 moves relative to the mandrel M so as to reciprocate between one end (in the left of the figures) and other end (in the right of the figures) of the mandrel M.

In synchronism with the mandrel moving table 11, the first hoop winding head 12 moves so as to maintain the predetermined distance W from the mandrel M, and the second hoop winding head 12' moves so as to maintain the position of other end (in the right of the figures) of the mandrel M.

Figure 18B:
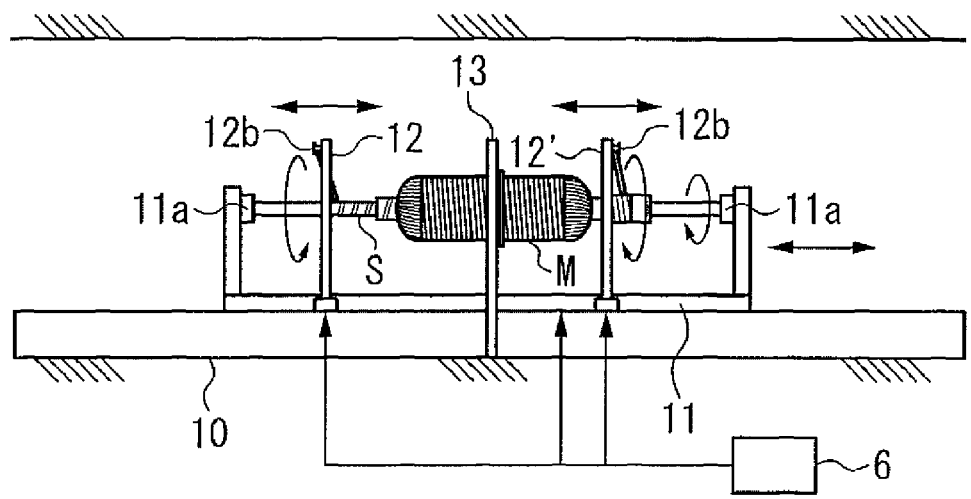
Figure 19A:
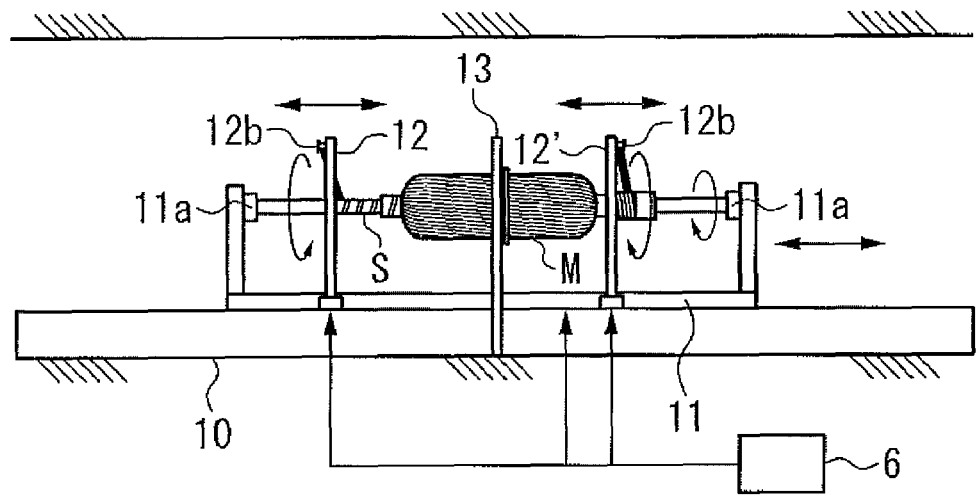
FIG. 19 is a side view continued from FIG. 18.

When helical winding is performed at the winding angle θ2 (>θ1) as shown in FIG. 18B and subsequently performed at the winding angle θ1 again as shown in FIG. 19A, the mandrel moving table 11, and the first and second hoop winding heads 12, 12' move as described above.

Figure 19B:
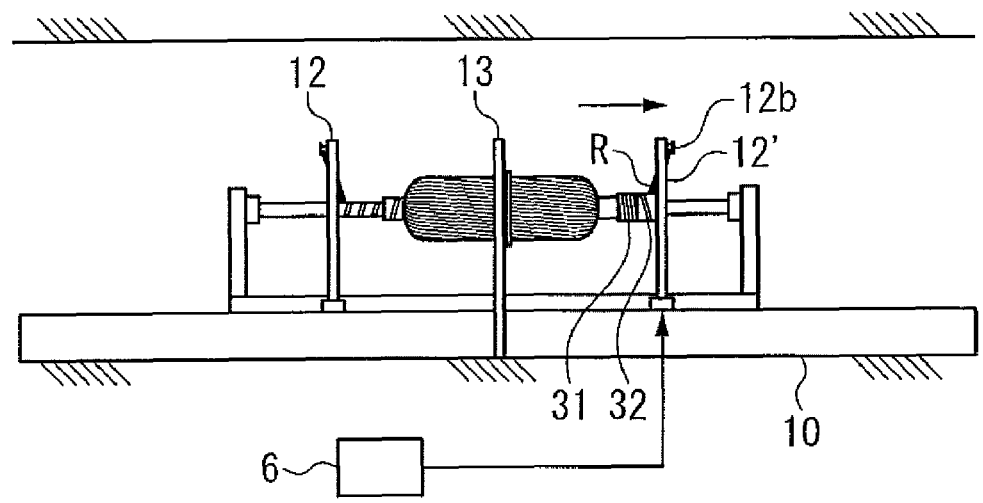

As shown in FIG. 19B, the second hoop winding head 12' moves to other end side (in the right of the figures) of the mandrel moving table 11. Thus, the fiber bundle R paid out from the hoop winding head 12' is wound around the first delivery ring 31 and the second delivery ring 32.

Figure 20A:
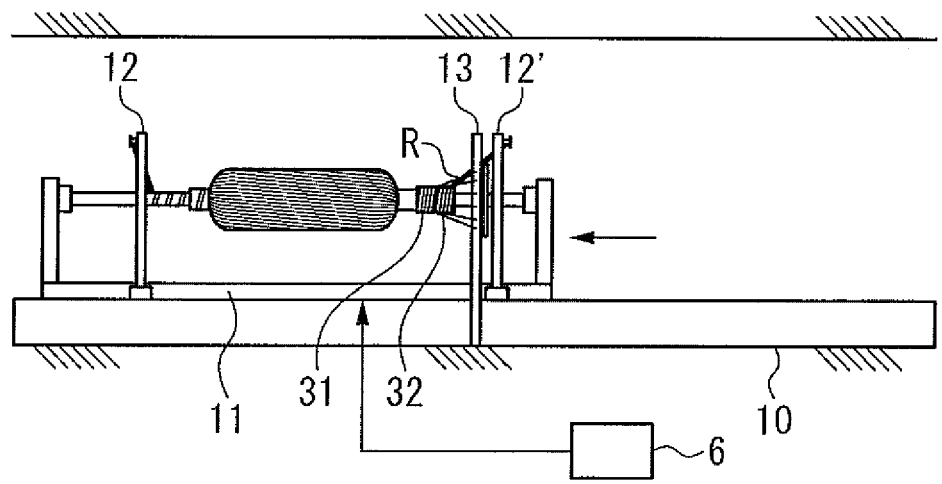
FIG. 20 is a side view continued from FIG. 19.

As shown in FIG. 20A, after a required number of layers of helical winding are obtained, the mandrel moving table 11 moves to one end side (in the left of the figures) of the machine body 10. The helical winding head 13 is placed at other end side (in the right of the figures) of the mandrel M2. Thus, the fiber bundle R paid out from the helical winding head 13 is wound around the first delivery ring 31 and the second delivery ring 32.

Figure 20B:
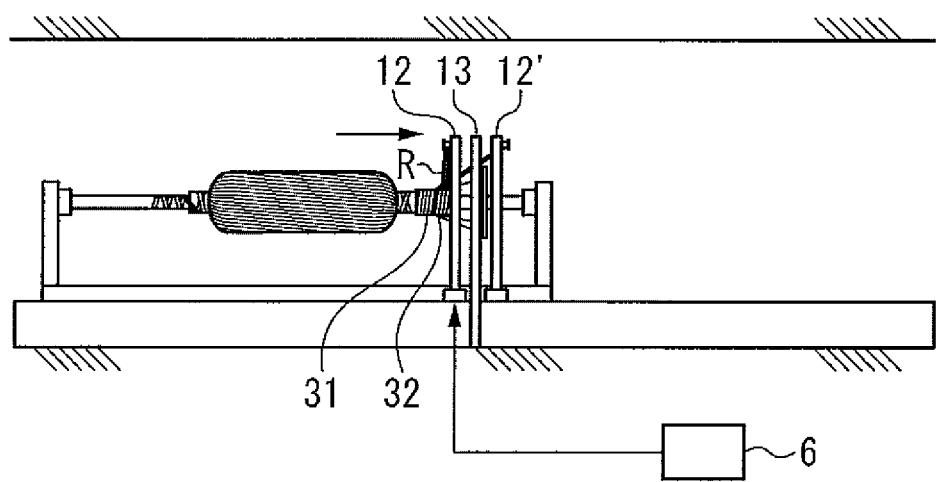

As shown in FIG. 20B, after a required number of layers of hoop winding are obtained, the first hoop winding head 12 moves to other end side (in the right of the figures) of the mandrel M2. Thus, the fiber bundle R paid out from the first hoop winding head 12 is wound around the first delivery ring 31 and the second delivery ring 32.

Consequently, the fiber bundle R paid out from the head portions 12, 12' 13 is wound and held around the first delivery ring 31 and the second delivery ring 32.

[Cutting Operation]

Figure 21A:
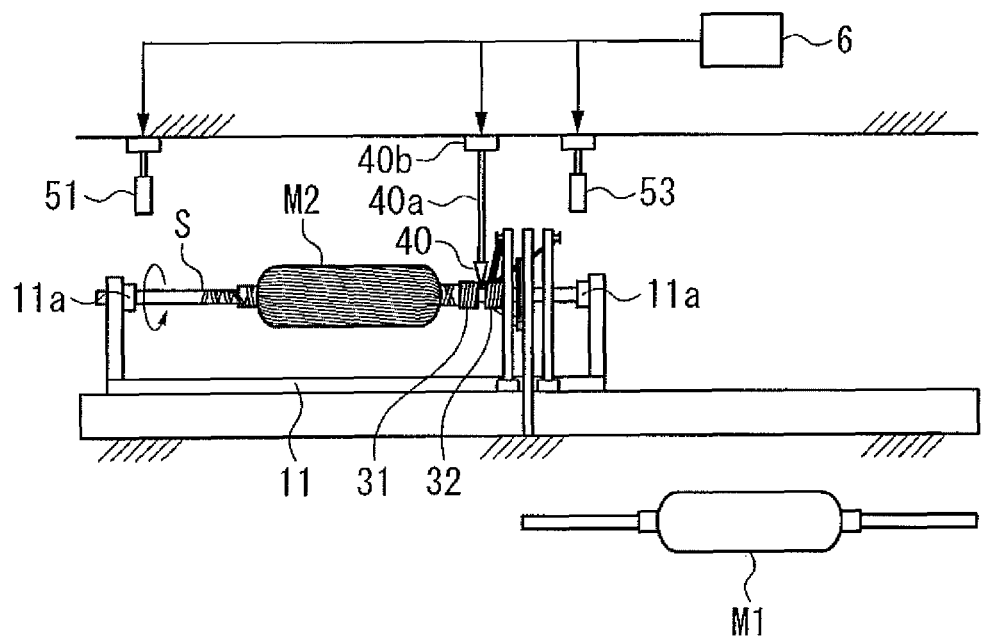
FIG. 21 is a side view continued from FIG. 20.

As shown in FIG. 21A, the cutter portion 40 places the cutting edge between the first delivery ring 31 and the second delivery ring 32. The mandrel rotating shafts 11a, 11a rotate the first delivery ring 31 and the second delivery ring 32 in conjunction with the mandrel M. Thus, the fiber bundle R wound around the first delivery ring 31 and the second delivery ring 32 is cut and separated between the first delivery ring 31 and the second delivery ring 32.

[Installing and Discharging Operation]

Figure 21B:
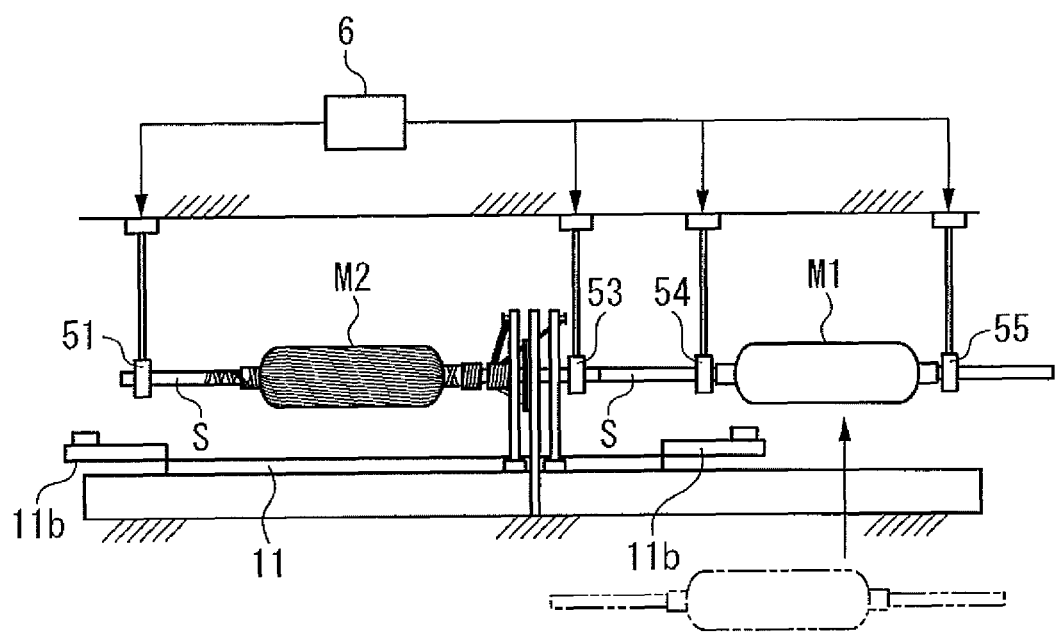

As shown in FIG. 21B, the first and third installing and discharging hand portions 51, 53 grip and hold the mandrel M2. The installing and discharging device 5 comprises a fourth installing and discharging hand portion 54, and a fifth installing and discharging hand portion 55. The fourth and fifth installing and discharging hand portions 54, 55 have the same configuration as that of the first hand portion 30 and the like, and are drivingly control led by the control section 6.

The opposite side wall portions 11b, 11b of the mandrel moving head 11 are brought down so as to allow the mandrel M2 to be discharged from the winding position or to allow the mandrel M1 to move to the winding position. The control section 6 allows the fourth and fifth installing and discharging hand portions 54, 55 to move while gripping and holding the mandrel M1 around which no fiber bundle has been wound yet and which is located on other end side (in the right of the figures) of the machine body 10. One end (in the left of the figures) of the spindle S for the mandrel M1 (in the right of the figures) abuts against other end (in the right of the figure) of the spindle S for the mandrel M2 (in the left of the figures).

Figure 22A:
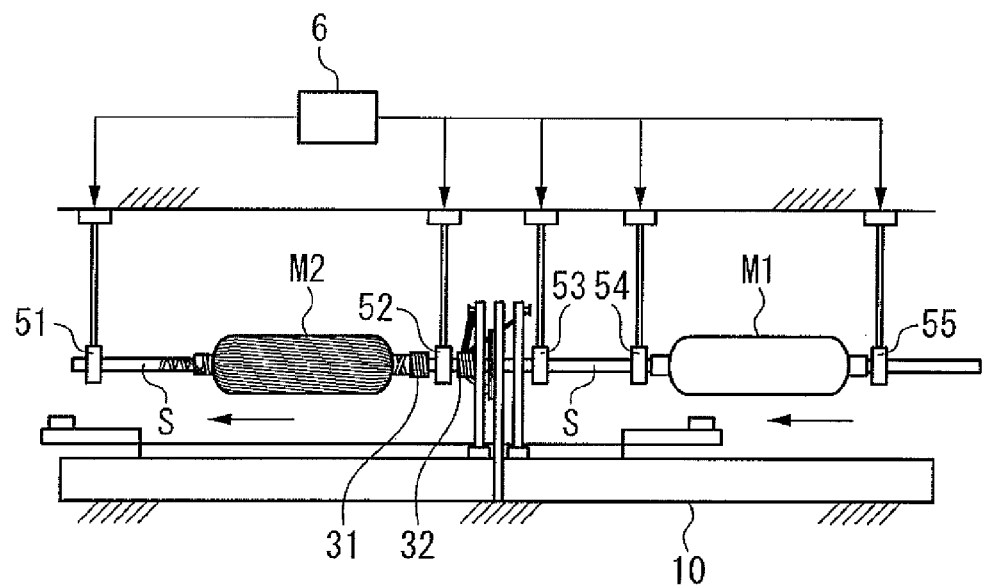
FIG. 22 is a side view continued from FIG. 21.

As shown in FIG. 22A, with the spindles for mandrel S, S abutting against each other, the first, third, fourth, and fifth installing and discharging hand portions 51, 53, 54, 55 slightly move the mandrel M2 (spindle for mandrel S) and the mandrel M1 (spindle for mandrel S) to one end side (in the left of the figures) of the machine body 10.

At this time, the chuck mechanisms (not shown in the drawings) provided on the head portions 12, 12', 13 release the first delivery ring 31 (the position of the second delivery ring 32 is fixed). Consequently, the first delivery ring 31 leaves the second delivery ring 32 together with the mandrel M2.

Then, the second installing and discharging portion 52 grips and holds the spindle S for the mandrel MS (in the left of the figures) between the first delivery ring 31 and the second delivery ring 32. Thus, the first and second installing and discharging portions 51, 52 hold the opposite sides, respectively, of the mandrel M2. The third installing and discharging portion 53 is retracted.

Moreover, with the spindles for mandrel S, S abutting against each other, the first, second, fourth, and fifth installing and discharging portions 51, 52, 54, 55 move the mandrel M2 (spindle for mandrel S) and the mandrel M1 (spindle for mandrel S) to one end side (in the left of the figures) of the machine body 10.

Thus, the second delivery ring 32 is fitted around (delivered to) the spindle S for the mandrel M1 (in the right of the figures) through the spindle S for the mandrel M2 (in the left of the figures) and held therein.

Figure 22B:
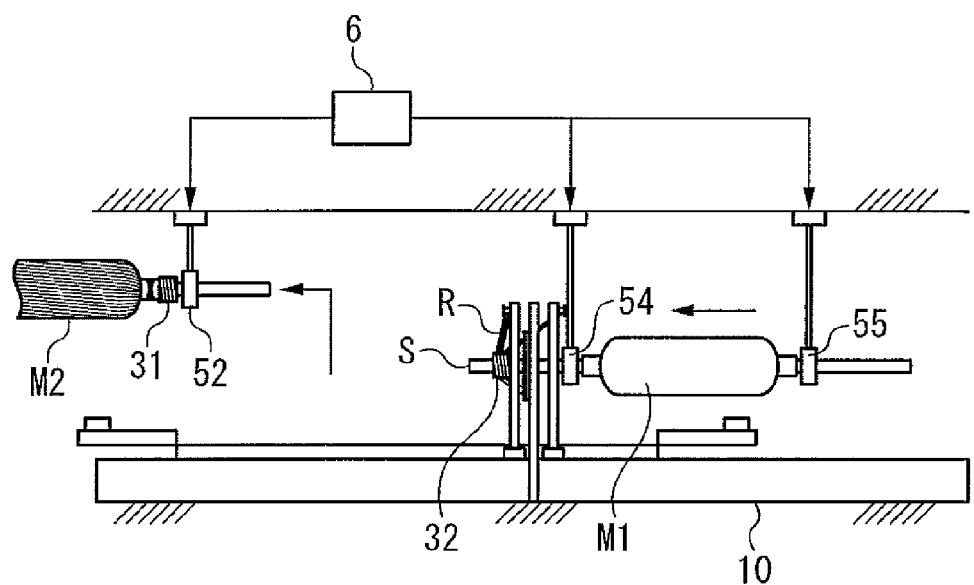

As shown in FIG. 22B, the first and second installing and discharging portions 51, 52 discharge the mandrel M2 around which the fiber bundle R has already been wound, from the winding position. The above-described manufacturing process completes one winding mandrel M2 (product). The fiber bundle R paid out from the head portions 12, 12', 13 is wound and held around the second delivery ring 32.

Figure 23A:
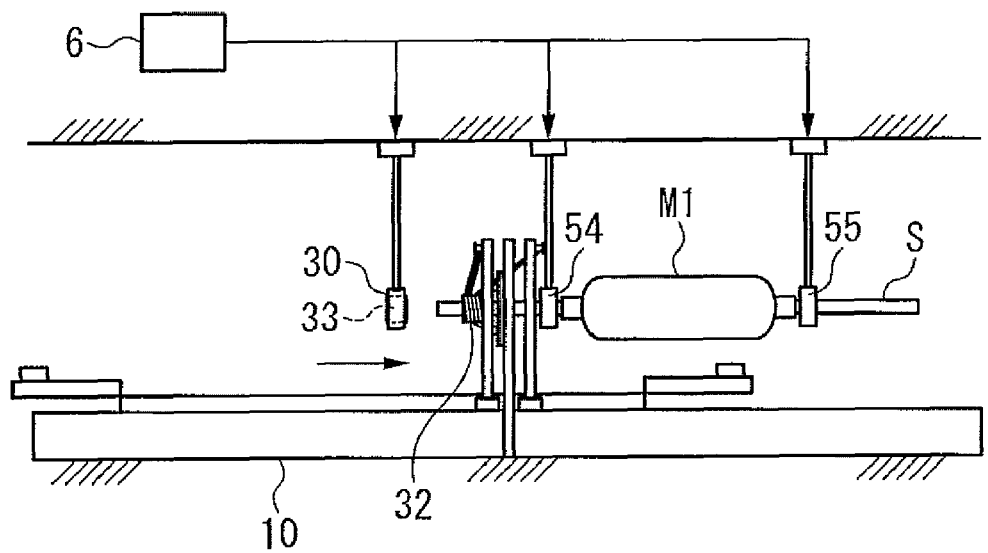
FIG. 23 is a side view continued from FIG. 22.

As shown in FIG. 23A, the control section 6 allows the delivery hand portion 30 to grip and hold the third delivery ring 33 and to move from one end side (in the left of the figures) of the machine body 10 to the mandrel M1 (in the right of the figures).

Figure 23B:
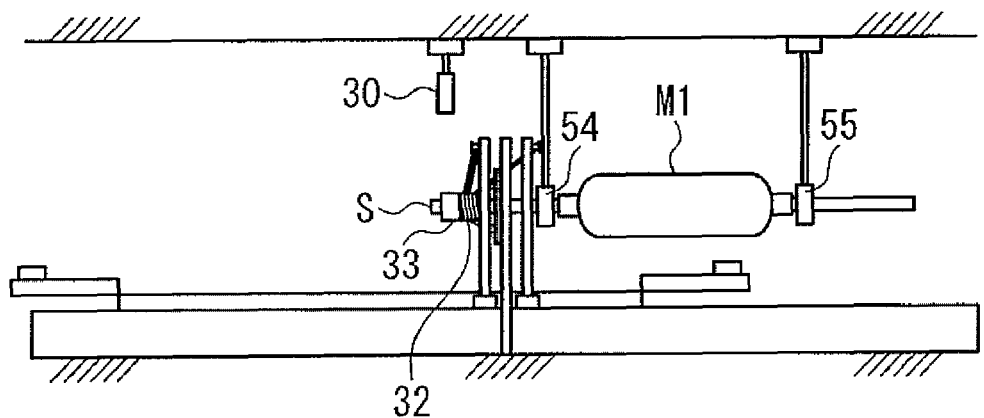

As shown in FIG. 23B, the delivery hand portion 30 fits the third delivery ring 33 around the spindle S for the mandrel M1. The second delivery ring 32 and the third delivery ring 33 are coupled together by the installing and removing mechanism (not shown in the drawings) utilizing, for example, the magnetic fore of the permanent magnet. The delivery hand portion 30 is then retracted.

Figure 24A:
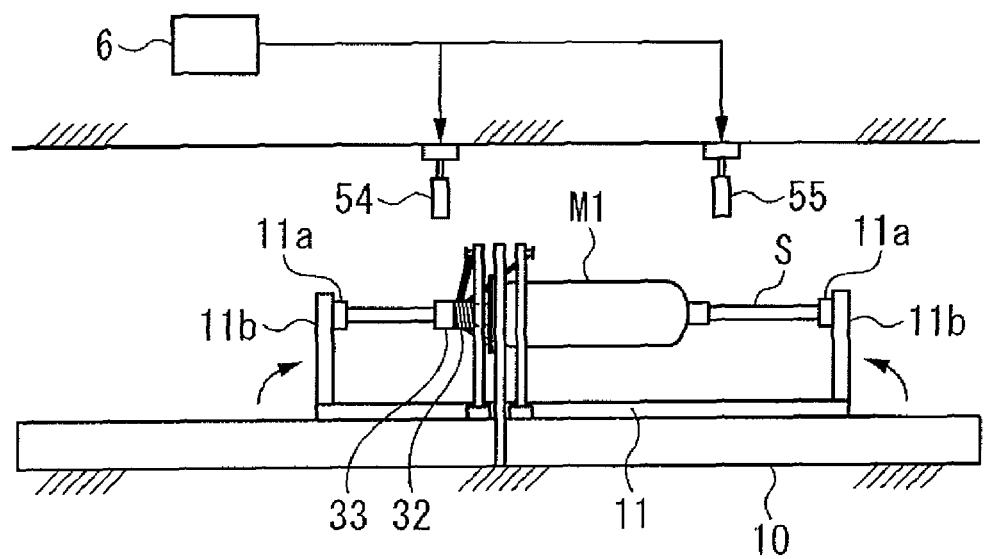
FIG. 24 is a side view continued from FIG. 23.

As shown in FIG. 24A, the opposite side wall portions 11b, 11b of the mandrel moving table 11 are set upright. The opposite ends of the spindle for mandrel S are coupled to the mandrel rotating shafts 11a, 11a, respectively. The mandrel M1 is thus installed at the winding position.

The third and fifth installing and discharging hand portions 53, 55 are retracted. The positions of the second delivery ring 32 and the third delivery ring 33 are fixed by the chuck mechanisms (not shown in the drawings) provided on the head portions 12, 12', 13. The second delivery ring 32 is coupled to the mandrel M1 by the coupling mechanism (not shown in the drawings).

[Delivery and Winding Operation]

Figure 24B:
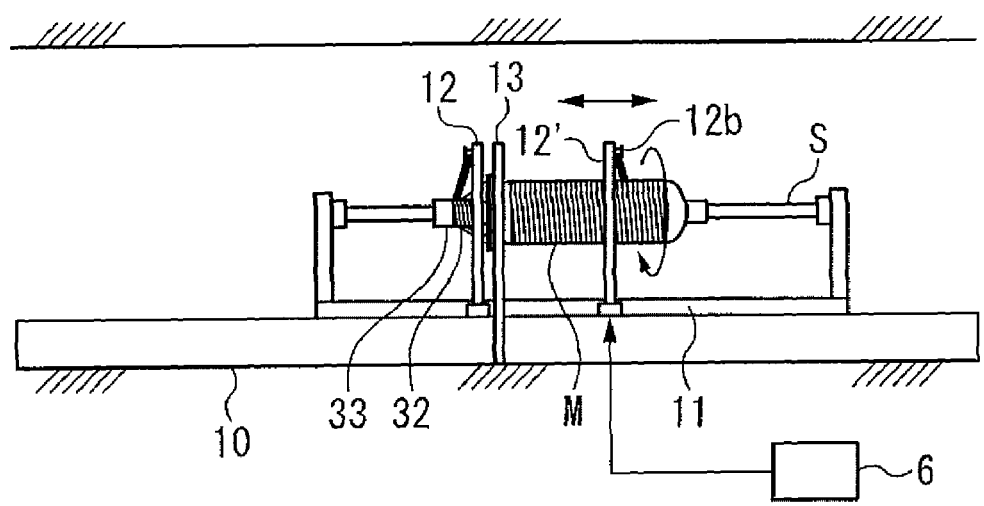

As shown in FIG. 24B, for hoop winding, the control section 6 allows the second hoop winding head 12' to operate. Until a require number of layers of the fiber bundle R are stacked, the second hoop winding head 12' reciprocates between one end (in the left of the figures) and other end (in the right of the figures) of the mandrel cylindrical portion Ma (FIG. 5). The mandrel moving table 11 and the first hoop winding head 12 are stopped.

The fiber bundle R paid out from the second hoop winding head 12' is wound around the mandrel M1 through the second delivery ring 32. Thus, the second delivery ring 32 delivers the fiber bundle R from the mandrel M2 around which the fiber bundle R has already been wound to the mandrel M1 around which no fiber bundle R has been wound yet.

Figure 25A:
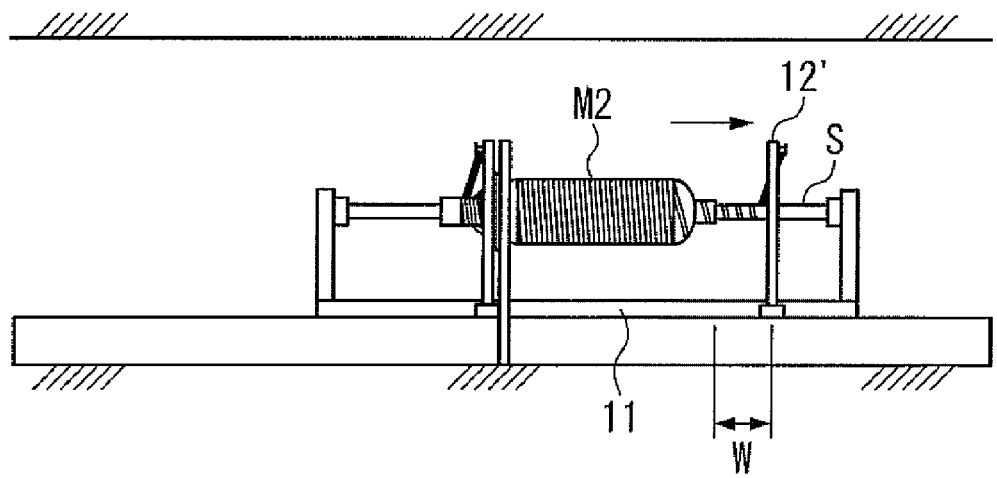
FIG. 25 is a side view continued from FIG. 24.

After the hoop winding is completed, the second hoop winding head 12' is retracted to other end side (in the right of the figures) of the mandrel moving table 11 as shown in FIG. 25A. The second hoop winding head 12' is located on the spindle for mandrel S at the predetermined distance W from the mandrel M.

Figure 25B:
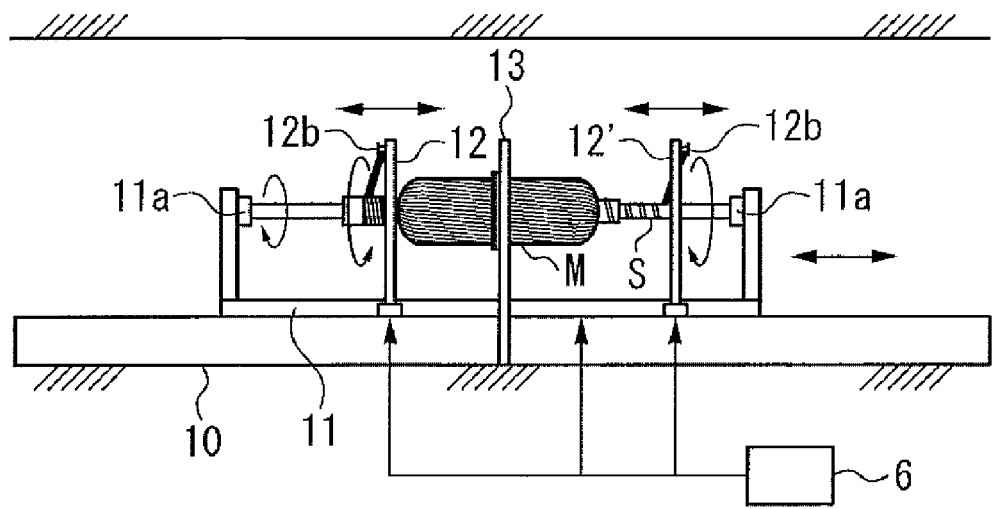

As shown in FIG. 25B, for helical winding (winding angle θ1), the control section 6 allows the mandrel moving table 11 to operate. Until a required number of layers of the fiber bundle R are stacked, the mandrel moving table 11 reciprocates relative to the mandrel M between one end (in the left of the figures) and other end (in the right of the figures) of the mandrel M.

In synchronism with the mandrel moving table 11, the second hoop winding head 12' moves so as to maintain the predetermined distance W from the mandrel M, and the first hoop winding head 12 moves so as to maintain the position of one end (in the left of the figures) of the mandrel M.

Figure 26A:
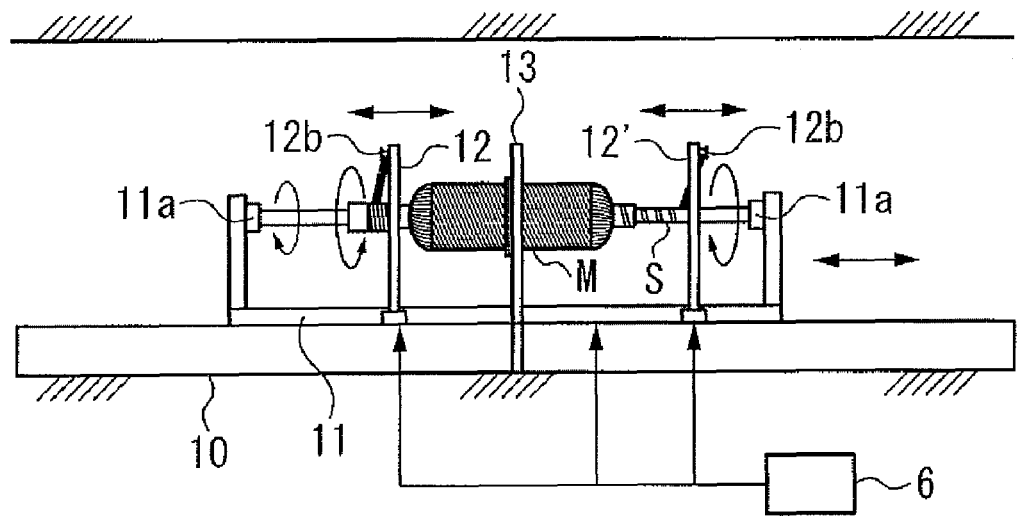
FIG. 26 is a side view continued from FIG. 25.

When helical winding is performed at the winding angle θ2 (>θ1) as shown in FIG. 26A and subsequently performed at the winding angle θ1 again as shown in FIG. 25B, the mandrel moving table 11 and the first and second hoop winding heads 12, 12' move as described above.

Figure 26B:
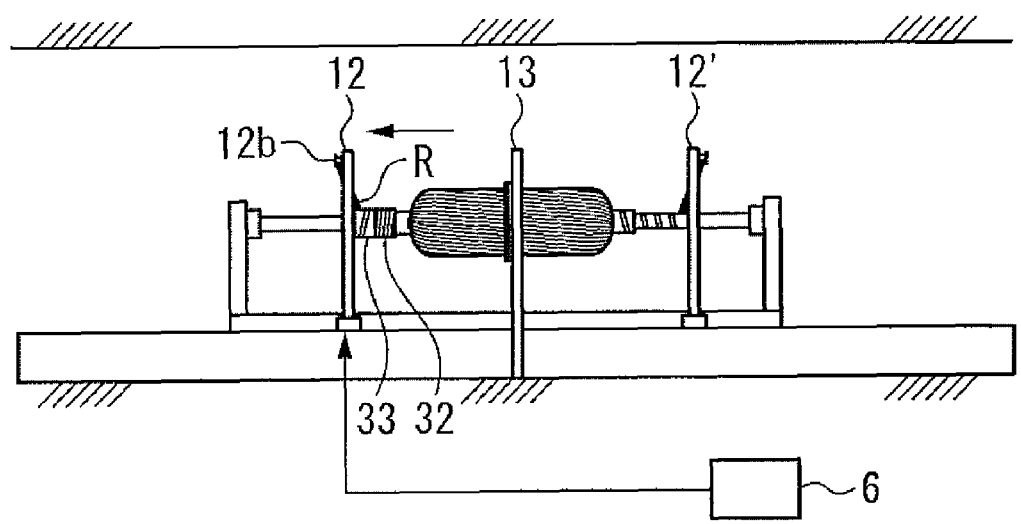

Subsequently, as shown in FIG. 26B, the first hoop winding head 12 moves to one end side (in the left of the figures) of the mandrel moving table 11. Thus, the fiber bundle R paid out from the hoop winding head 12 is wound around the second delivery ring 32 and the third delivery ring 33.

Figure 27A:
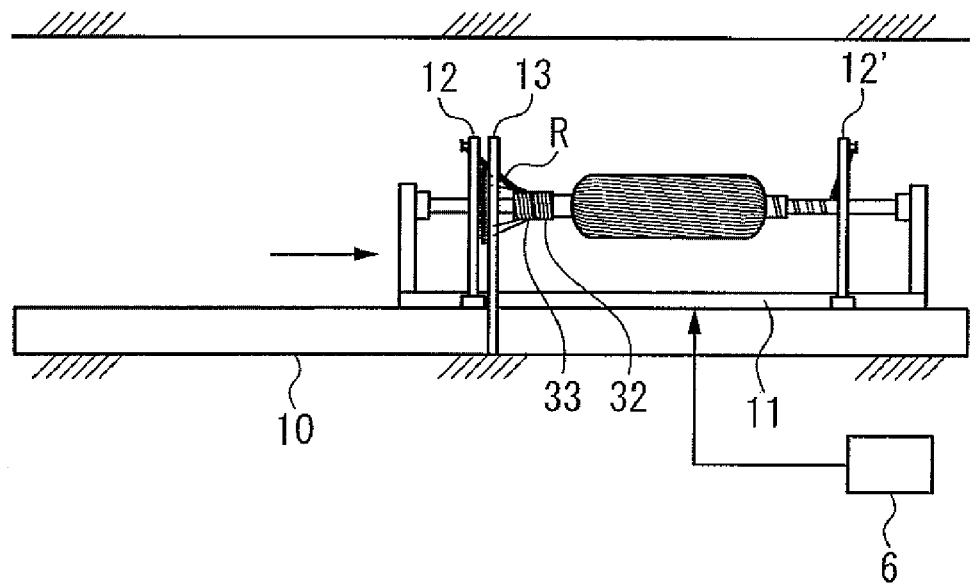
FIG. 27 is a side view continued from FIG. 26.

As shown in FIG. 27A, the mandrel moving table 11 moves to other end side (in the right of the figures) of the machine body 10. The helical winding head 13 is placed at one end side (in the left of the figures) of the mandrel M2. Thus, the fiber bundle R paid out from the helical winding head 13 is wound around the second delivery ring 32 and the third delivery ring 33.

Figure 27B:
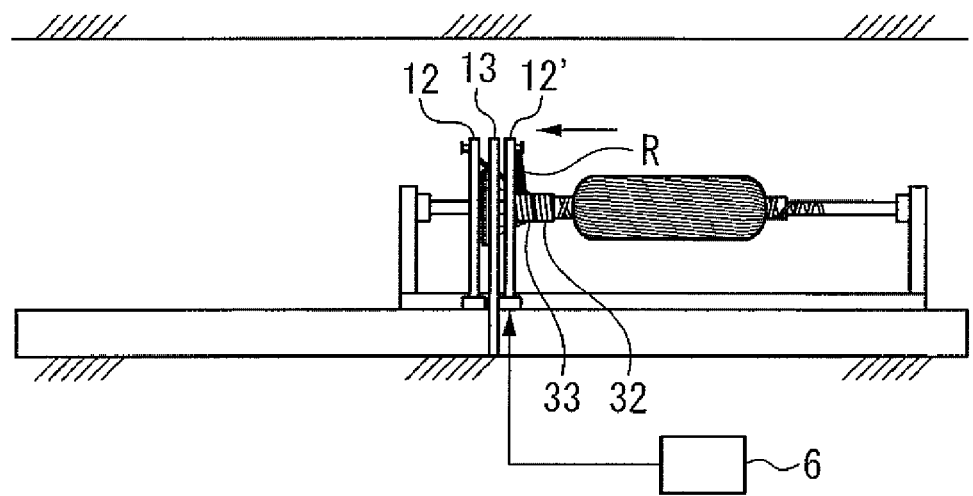

As shown in FIG. 27B, the second hoop winding head 12' moves to one end side (in the left of the figures) of the mandrel moving table 11. Thus, the fiber bundle R paid out from the second hoop winding head 12' is wound around the second delivery ring 32 and the third delivery ring 33.

Consequently, the fiber bundle R paid out from the head portions 12, 12' 13 is wound and held around the second delivery ring 32 and the third delivery ring 33.

[Cutting Operation]

Figure 28A:
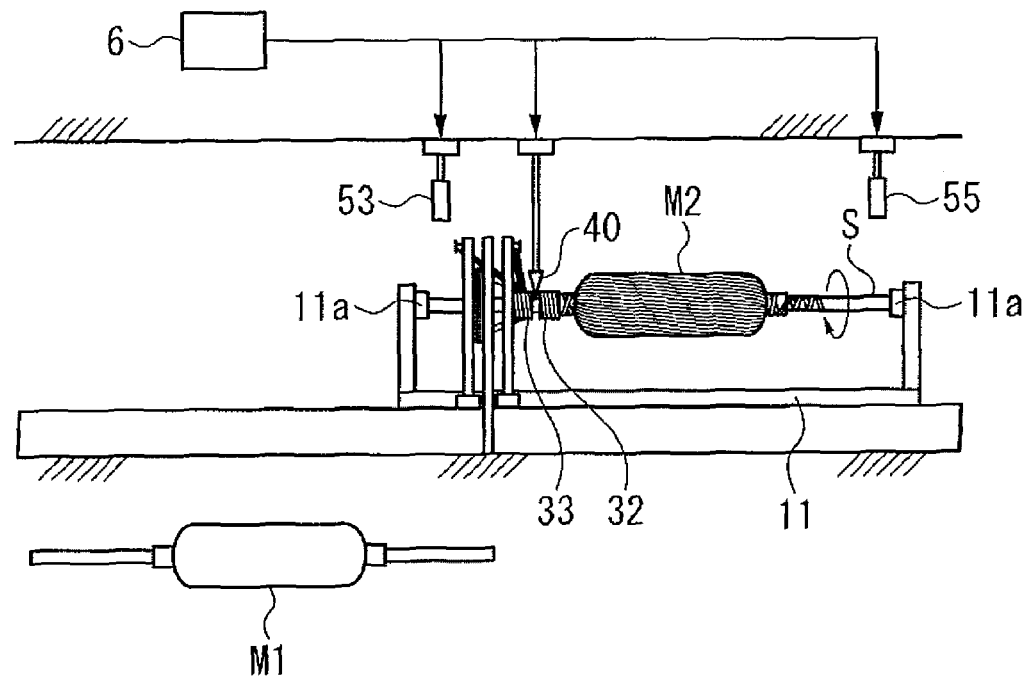
FIG. 28 is a side view continued from FIG. 27.

As shown in FIG. 28A, the cutter portion 40 places the cutting edge between the second delivery ring 32 and the third delivery ring 33. The mandrel rotating shafts 11a, 11a rotate the second delivery ring 32 and the third delivery ring 33 in conjunction with the mandrel M2. Thus, the fiber bundle R wound around the second delivery ring 32 and the third delivery ring 33 is cut and separated between the second delivery ring 32 and the third delivery ring 33.

[Installing and Discharging Operation]

Figure 28B:
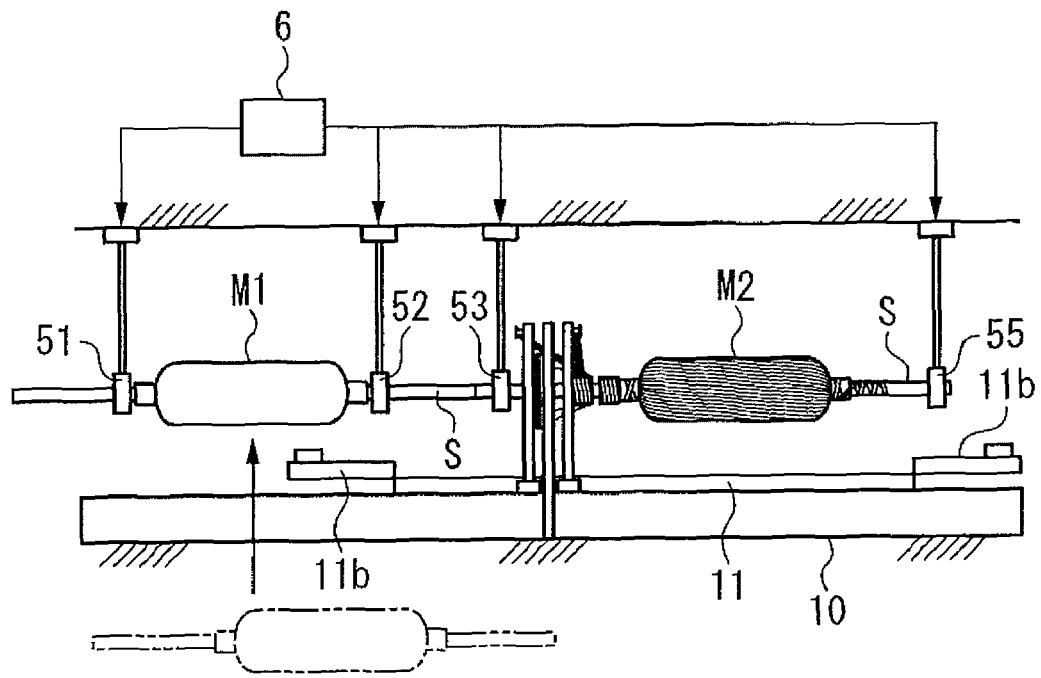

As shown in FIG. 28B, the third and fifth installing and discharging hand portions 53, 55 grip and hold the mandrel M2. The opposite side wall portions 11b, 11b of the mandrel moving table 11 are brought down. The control section 6 allows the first and second installing and discharging hand portions 51, 52 to move while gripping and holding the mandrel M1 around which no fiber bundle has been wound yet and which is located on one end side (in the left of the figures) of the machine body 10. Other end (in the right of the figures) of the spindle S for the mandrel M1 (in the left of the figures) abuts against one end (in the left of the figure) of the spindle S for the mandrel M2 (in the right of the figures).

Figure 29A:
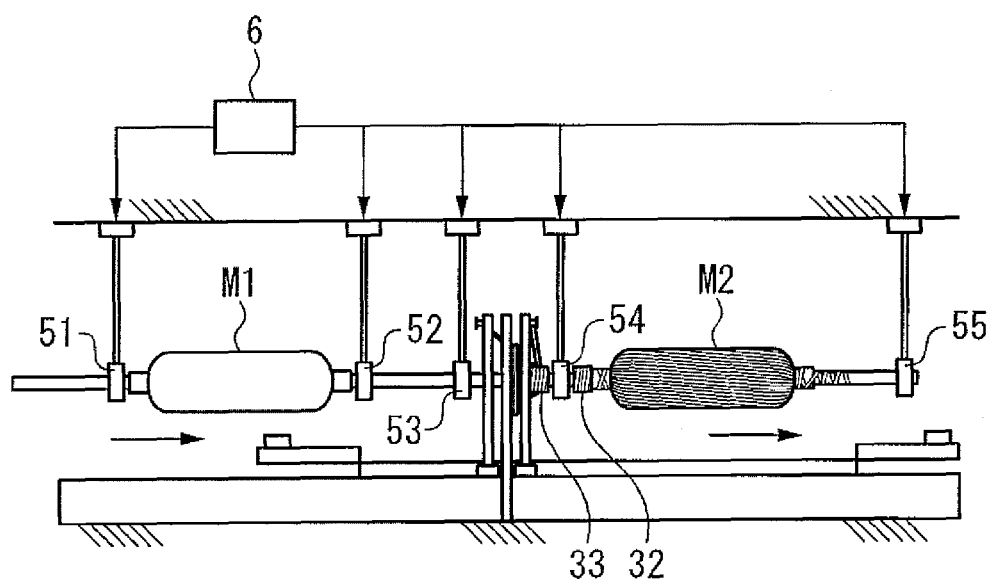
FIG. 29 is a side view continued from FIG. 28.

As shown in FIG. 29A, with the spindles for mandrel S, S abutting against each other, the first, second, third, and fifth installing and discharging hand portions 51, 52, 53, 55 slightly move the mandrel M2 (spindle for mandrel S) and the mandrel M1 (spindle for mandrel S) to other end side (in the right of the figures) of the machine body 10.

At this time, the chuck mechanisms (not shown in the drawings) provided on the head portions 12, 12', 13 release the second delivery ring 32 (the position of the third delivery ring 33 is fixed). Consequently, the second delivery ring 32 leaves the third delivery ring 33 together with the mandrel M2.

Then, the fourth installing and discharging portion 54 grips and holds the spindle S for the mandrel M2 (in the left of the figures) between the second delivery ring 32 and the third delivery ring 33. Thus, the fourth and fifth installing and discharging portions 54, 55 hold the opposite sides, respectively, of the mandrel M2. The third installing and discharging portion 53 is retracted.

Moreover, with the spindles for mandrel S, S abutting against each other, the first, second, fourth, and fifth installing and discharging portions 51, 52, 54, 55 move the mandrel M2 (spindle for mandrel S) and the mandrel M1 (spindle for mandrel S) to other end side (in the right of the figures) of the machine body 10.

Thus, the third delivery ring 33 is fitted around (delivered to) the spindle S for the mandrel M1 (in the left of the figures) through the spindle S for the mandrel M2 (in the right of the figures) and held therein.

Figure 29B:
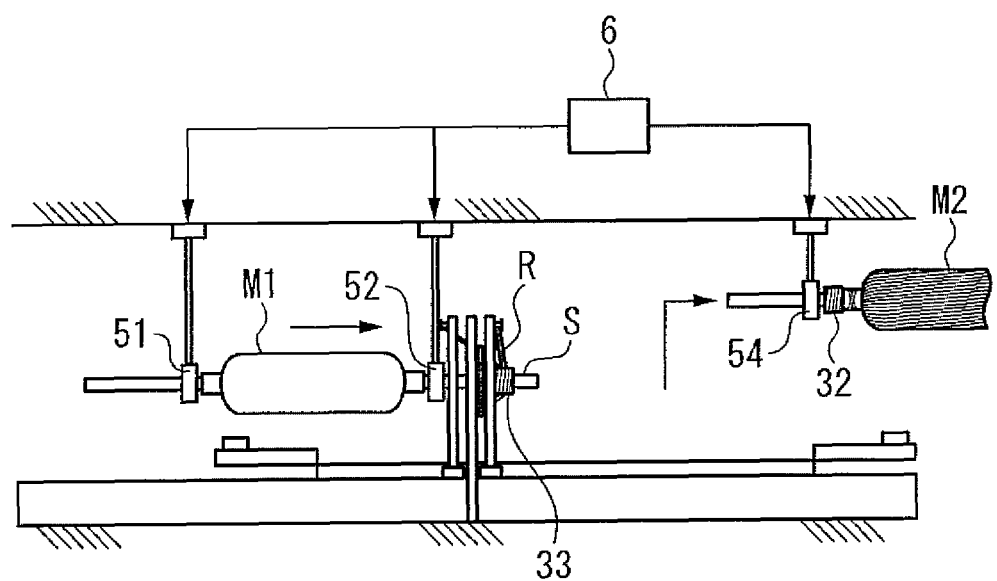

As shown in FIG. 29B, the fourth and fifth installing and discharging portions 54, 55 discharge the mandrel M2 around which the fiber bundle R has already been wound, from the winding position. The above-described manufacturing process further completes one winding mandrel M2 (product). The fiber bundle R paid out from the head portions 12, 12', 13 is wound and held around the third delivery ring 33.

Figure 30A:
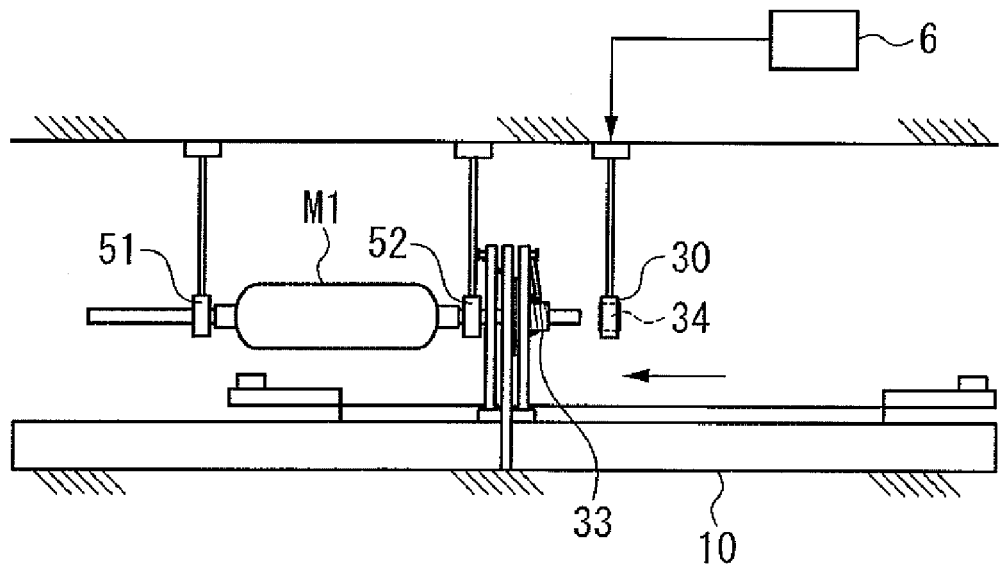
FIG. 30 is a side view continued from FIG. 29.

As shown in FIG. 30A, the control section 6 allows the delivery hand portion 30 to grip and hold the fourth delivery ring 34 and to move from other end side (in the right of the figures) of the machine body 10 to the mandrel M1 (in the left of the figures).

Figure 30B:
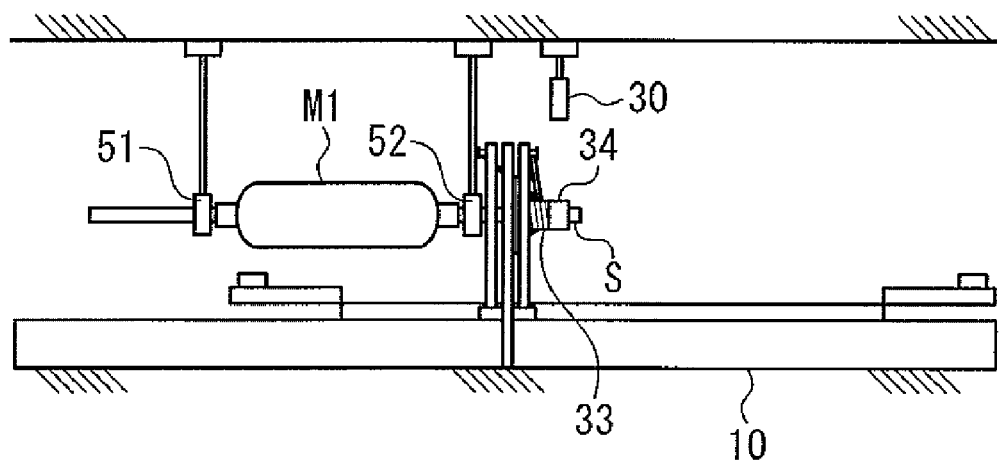

As shown in FIG. 30B, the delivery hand portion 30 fits the fourth delivery ring 34 around the spindle S for the mandrel M1. The delivery hand portion 30 is retracted. FIG. 30B shows a condition corresponding to that shown in FIG. 16A.

[Delivery Operation]

Subsequently, the above-described [installing operation] (FIG. 16B) and [winding operation] (FIGS. 17 to 19A) are performed. The fiber bundle R paid out from the head portions 12, 12' 13 is wound around the mandrel M1 through the third delivery ring 33. Consequently, the third delivery ring 33 delivers the fiber bundle R from the mandrel M2 around which the fiber bundle has already been wound to the mandrel M1 around which no fiber bundle has been wound yet.

Then, after the winding operation is completed, the fiber bundle R wound around the mandrel M2 is wound around the fourth delivery ring 34 (FIG. 19B) to FIG. 20). Subsequently, the [cutting operation], [installing and discharging operation] (FIG. 21 to FIG. 30) are performed. The fourth delivery ring 34 delivers the fiber bundle R from the mandrel M2 around which the fiber bundle has already been wound to the mandrel M1 around which no fiber bundle has been wound yet.

[Repeating Operation]

The production line can be automated by repeating the [installing operation ], [winding operation], [cutting operation], [discharging operation], and [delivery operation] (FIG. 16B to FIG. 30) as described above.

In the second embodiment, the following operations can be performed on one end side (in the left side of the figures) and other end side (in the right side of the figures), respectively, of the machine body 10: the installing operation for the mandrel M1 around which no fiber bundle has been wound yet and the discharging operation for the mandrel M2 around which the fiber bundle R has been wound. The installing and discharging operations can thus be performed more efficiently.

While the present invention has been described with respect to preferred embodiments thereof, it will be apparent to those skilled in the art that the disclosed invention may be modified in numerous ways and may assume many embodiments other than those specifically set out and described above. Accordingly, it is intented by the appended claims to cover all modifications of the present invention that fall within the true spirit and scope of the invention.

The invention claimed is:

1. A filament winding automated system comprising:
   a winding device winding a fiber bundle paid out from a head portion, around a mandrel,
   an installing device installing said mandrel around which no fiber bundle has been wound yet, at a winding position,
   a discharging device discharging said mandrel around which said fiber bundle has already been wound, from said winding position,
   a delivery device holding and delivering said fiber bundle from said mandrel around which said fiber bundle has already been wound to a mandrel around which no fiber bundle has been wound yet, and
   a cutting device cutting said fiber bundle, wherein
   said delivery device releases two delivery rings to a spindle that is extendedly installed to said mandrel,
   said delivery device fits said two delivery rings to said spindle, and from this position, said winding device starts winding using one of said delivery rings as a start point of said fiber bundle, and completes winding using the other of said delivery rings as an end point of said fiber bundle,
   said cutting device cuts and separates said fiber bundle from said mandrel around which said fiber bundle has already been wound,
   said discharging device discharges said mandrel around which said fiber bundle has already been wound with said one of said delivery rings,
   said installing device installs said mandrel around which no fiber bundle has been wound yet,
   said delivery device fits said other delivery ring and another delivery ring on said spindle, and said winding device starts winding using said other delivery ring as a start point of said fiber bundle.

2. A filament winding automated system according to claim 1, characterized in that said head portion comprises a hoop winding head winding said fiber bundle around the mandrel in hoop form, and said hoop winding head comprises a bobbin from which said fiber bundle is paid out to said mandrel and a revolving mechanism revolving said bobbin in a circumferential direction of said mandrel, and reciprocates relative to said mandrel in an axial direction of said mandrel.

3. A filament winding automated system according to claim 1 or claim 2, characterized in that said head portion comprises a helical winding head winding said fiber bundle around said mandrel in helical form, and reciprocates relative to said mandrel in an axial direction of said mandrel.

4. A filament winding automated system by comprising:
a winding device winding a fiber bundle paid out from a head portion, around a mandrel,
an installing device installing said mandrel around which no fiber bundle has been wound yet, at a winding position,
a discharging device discharging said mandrel around which said fiber bundle has already been wound, from said winding position,
a delivery device holding and delivering said fiber bundle from said mandrel around which said fiber bundle has already been wound to a mandrel around which no fiber bundle has been wound yet, and
a cutting device cutting said fiber bundle, wherein
said winding device comprises'a helical head winding said fiber bundle around said mandrel in helical form, and a pair of hoop winding heads which are arranged on opposite sides of said helical winding head, to wind said fiber bundle around said mandrel in hoop form,
said delivery device releases two delivery rings to a spindle that is extendedly installed to said mandrel,
said delivery device fits said two delivery rings to said spindle, and from this position, said winding device starts winding using one of said delivery rings as a start point of said fiber bundle, and completes winding using the other of said delivery rings as an end point of said fiber bundle,
said cutting device cuts and separates said fiber bundle from said mandrel around which said fiber bundle has already been wound,
said discharging device discharges said mandrel around which said fiber bundle has already been wound with said one of said delivery rings,
said installing device installs said mandrel around which no fiber bundle has been wound yet,
said delivery device fits said other delivery ring and another delivery rind on said spindle, and
said winding device starts winding using said other delivery ring as a start point of said fiber bundle.

5. A filament winding automated system according to claim 4, characterized in that said hoop winding head comprises a moving base reciprocating in an axial direction of said mandrel, a bobbin from which said fiber bundle is supplied to said mandrel, and a revolving mechanism revolving said bobbin in a circumferential direction of said mandrel, and
when hoop winding is performed, a position of said mandrel is fixed and said revolving mechanism rotates said bobbin, while said moving base reciprocates said hoop winding head.

6. A filament winding automated system according to claim 4 or claim 5, characterized by further comprising a mandrel rotating shaft rotating said mandrel in the circumferential direction, and a mandrel moving table reciprocating said mandrel in the axial direction, and
when helical winding is performed, a position of said helical winding head is fixed and said mandrel rotating shaft rotates said mandrel, while said mandrel moving head reciprocates said mandrel.

* * * * *